US012764733B2

(12) United States Patent
Nory et al.

(10) Patent No.: US 12,764,733 B2
(45) Date of Patent: Oct. 13, 2026

(54) CELL MONITORING IN CROSS-CARRIER SCHEDULING

(71) Applicant: Telefonaktiebolaget LM Ericsson (publ), Stockholm (SE)

(72) Inventors: Ravikiran Nory, San José, CA (US); Ajit Nimbalker, Dublin, CA (US); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 385 days.

(21) Appl. No.: 18/018,980

(22) PCT Filed: Aug. 6, 2021

(86) PCT No.: PCT/EP2021/072070
§ 371 (c)(1),
(2) Date: Jan. 31, 2023

(87) PCT Pub. No.: WO2022/029319
PCT Pub. Date: Feb. 10, 2022

(65) Prior Publication Data

US 2023/0284205 A1 Sep. 7, 2023

Related U.S. Application Data

(60) Provisional application No. 63/062,373, filed on Aug. 6, 2020.

(51) Int. Cl.
*H04W 72/1263* (2023.01)
*H04L 1/00* (2006.01)
*H04W 72/232* (2023.01)

(52) U.S. Cl.
CPC ....... *H04W 72/1263* (2013.01); *H04L 1/0061* (2013.01); *H04W 72/232* (2023.01)

(58) Field of Classification Search
CPC ............... H04W 72/232; H04W 72/23; H04W 72/1263; H04L 5/001; H04L 1/0061
See application file for complete search history.

(56) References Cited

U.S. PATENT DOCUMENTS

2012/0207107 A1 8/2012 Li et al.
2013/0215875 A1 8/2013 Yang et al.
(Continued)

FOREIGN PATENT DOCUMENTS

CA 3110929 A1 3/2020
CN 104937865 A 9/2015
(Continued)

OTHER PUBLICATIONS

3GPP TS 38.213 V16.2.0, "3rd Generation Partnership Project; Technical Specification Group Radio Access Network; NR; Physical layer procedures for control (Release 16)," Jun. 2020, 176 pages.
(Continued)

*Primary Examiner* — Andrew Lee
(74) *Attorney, Agent, or Firm* — Sage Patent Group

(57) ABSTRACT

A communication device can operate in a communications network and be configured to communicate with a network node operating in the communications network via a primary cell, PCell, and a secondary cell, SCell. The communication device can receive a configuration message from the network node indicating to monitor the SCell for first scheduling information associated with communications via the PCell. Responsive to receiving the configuration message, the communication device can monitor the SCell for the first scheduling information associated with communication via the PCell. Responsive to receiving the configuration message, the communication device can monitor the PCell for second scheduling information associated with communication via the PCell. Responsive to receiving the configuration message, the communication device can
(Continued)

receive, via the SCell, the first scheduling information associated with communication via the PCell.

17 Claims, 18 Drawing Sheets

(56) References Cited

U.S. PATENT DOCUMENTS

| | | | | |
|---|---|---|---|---|
| 2013/0315135 | A1 | 11/2013 | Lee et al. | |
| 2014/0016593 | A1 | 1/2014 | Park et al. | |
| 2016/0374082 | A1 | 12/2016 | Nguyen et al. | |
| 2018/0152954 | A1 | 5/2018 | Golitschek Edler Von Elbwart et al. | |
| 2018/0343102 | A1* | 11/2018 | Sebire | H04L 5/001 |
| 2019/0357238 | A1 | 11/2019 | Zhou et al. | |
| 2020/0163114 | A1 | 5/2020 | Chen Larsson et al. | |
| 2020/0305134 | A1 | 9/2020 | Noh et al. | |
| 2020/0313834 | A1 | 10/2020 | He | |
| 2021/0168774 | A1 | 6/2021 | Li et al. | |
| 2021/0250920 | A1* | 8/2021 | Kim | H04W 72/0453 |
| 2021/0329677 | A1 | 10/2021 | Huang | |
| 2021/0352696 | A1 | 11/2021 | Yoshimura et al. | |
| 2022/0294578 | A1 | 9/2022 | Kim et al. | |
| 2022/0408458 | A1 | 12/2022 | MolavianJazi et al. | |
| 2022/0408465 | A1* | 12/2022 | Ji | H04W 72/20 |
| 2023/0026760 | A1* | 1/2023 | Takeda | H04W 24/08 |
| 2023/0036466 | A1 | 2/2023 | Yoshioka et al. | |
| 2023/0047144 | A1* | 2/2023 | Gao | H04L 5/0007 |
| 2023/0055673 | A1* | 2/2023 | Takeda | H04W 74/006 |
| 2023/0070761 | A1* | 3/2023 | Kim | H04W 72/0446 |
| 2023/0084554 | A1 | 3/2023 | Shi et al. | |
| 2023/0085345 | A1 | 3/2023 | Li et al. | |
| 2023/0096674 | A1 | 3/2023 | Fu et al. | |
| 2023/0164771 | A1 | 5/2023 | Liu et al. | |
| 2023/0217452 | A1* | 7/2023 | Kim | H04L 5/001 370/329 |
| 2023/0247501 | A1* | 8/2023 | Kim | H04L 5/0023 370/331 |
| 2023/0254857 | A1* | 8/2023 | Moon | H04B 17/24 370/329 |

FOREIGN PATENT DOCUMENTS

| | | | |
|---|---|---|---|
| CN | 107005392 | A | 8/2017 |
| CN | 107624264 | A | 1/2018 |
| CN | 110475356 | A | 11/2019 |
| CN | 110830216 | A | 2/2020 |
| CN | 110876179 | A | 3/2020 |
| CN | 111132344 | A | 5/2020 |
| CN | 111132359 | A | 5/2020 |
| CN | 113271185 | A | 8/2021 |
| CN | 113965299 | B | 4/2024 |
| EP | 3952158 | A1 | 2/2022 |
| JP | 2016-006980 | A | 1/2016 |
| JP | 2018-522452 | A | 8/2018 |
| WO | 2020029945 | A1 | 2/2020 |
| WO | 2021130940 | A1 | 7/2021 |
| WO | 2021155790 | A1 | 8/2021 |
| WO | 2021160011 | A1 | 8/2021 |
| WO | 2021172851 | A1 | 9/2021 |
| WO | 2021239040 | A1 | 12/2021 |
| WO | 2022017386 | A1 | 1/2022 |
| WO | 2022029312 | A1 | 2/2022 |
| WO | 2022029316 | A1 | 2/2022 |
| WO | 2022084552 | A1 | 4/2022 |
| WO | 2023012731 | A1 | 2/2023 |

OTHER PUBLICATIONS

Ericsson, "Dynamic spectrum sharing in Rel-17," RP-191052, 3GPP TSG RAN Meeting #84, Newport Beach, CA, USA Jun. 3-6, 2019, 6 pages.

Ericsson, "New WID on NR Dynamic spectrum sharing (DSS)," RP-193260, 3GPP TSG RAN Meeting #86, Sitges, Spain, Dec. 9-12, 2019, 4 pages.

Ericsson, "Summary of Rel-17 email discussion on NR dynamic spectrum sharing," RP-192677, 3GPP TSG-RAN Meeting #86, Sitges, Spain, Dec. 9-12, 2019, 5 pages.

Huawei, "Summary of Rel-17 email discussion on MR-DC enhancements," RP-192967, 3GPP TSG RAN Meeting #86, Sitges, Spain, Dec. 9-12, 2019, 44 pages.

Intel Corporation, "Special SCell functionality in dual connectivity," R2-141202, 3GPP TSG RAN WG2 Meeting #85bis, Valencia, Spain, Mar. 31-Apr. 4, 2014, 3 pages.

Motorola, "PDCCH Design for Cross-Carrier Operation Using CIF," R1-094830, 3GPP TSG RAN WG1 Meeting #59, Jeju, Korea, Nov. 9-13, 2009, 3 pages.

NTT DOCOMO, Inc., "Search space," R1-1807058, 3GPP TSG RAN WG1 Meeting #93, Busan, South Korea, May 21-25, 2018, 5 pages.

Japanese First Office Action dated May 20, 2024, for Application No. 2023-524789, 7 pages.

ZTE, "Discussion on Cross-Carrier Scheduling from SCell to Pcell", 3GPP TSG RAN WG1 Meeting #102-e, R1-2005440, e-Meeting, Aug. 17-28, 2020, 5 pages.

International Search Report and Written Opinion of the International Searching Authority, PCT/EP2021/072070, mailed Nov. 17, 2021, 15 pages.

Huawei, Hisilicon, "NR CA enhancements and DSS," 3GPP RSG RAN Meeting #86, RP-192797, Sitges, Spain, Dec. 9-12, 2019, 2 pages.

Ericsson, "Enhanced cross-carrier scheduling for DSS," 3GPP TSG-RAN WG1 #102-e, R1-2006671, eMeeting, Aug. 17-28, 2020, 6 pages.

Examination Report for Australian Patent Application No. 2021322743, dated Jan. 19, 2024, 6 pages.

3GPP TS 38.211 V16.6.0, "3rd Generation Partnership Project; Technical Specification Group Radio Access Network; NR; Physical Channels and Modulation (Release 16)," Jun. 2021, 134 pages.

International Search Report and Written Opinion of the International Searching Authority, PCT/EP2021/079489, mailed Feb. 3, 2022, 12 pages.

International Search Report and Written Opinion of the International Searching Authority, PCT/EP2021/072064, mailed Nov. 24, 2021, 15 pages.

International Search Report and Written Opinion of the International Searching Authority, PCT/EP2021/072054, mailed Nov. 19, 2021, 12 pages.

Taiwan Office Action and English Summary dated Apr. 25, 2022, for Application No. 110129137, 19 pages.

International Search Report and Written Opinion of the International Searching Authority, PCT/IB2022/057280, mailed Nov. 2, 2022, 10 pages.

Li Zeng, "Research and Realization of Physical Downlink Control Channel in LTE-A System" S130101003, Master's Thesis English Translation, Jun. 8, 2016, 100 pages.

* cited by examiner

CELL MONITORING IN CROSS-CARRIER SCHEDULING

CROSS REFERENCE TO RELATED APPLICATIONS

This application is a 35 U.S.C. § 371 national stage application of PCT International Application No. PCT/EP2021/072070 filed on Aug. 6, 2021, which in turn claims domestic priority to U.S. Provisional Patent Application No. 63/062,373, filed on Aug. 6, 2020, the disclosures and content of which are incorporated by reference herein in their entirety.

TECHNICAL FIELD

The present disclosure is related to wireless communication systems and more particularly to cross-carrier scheduling.

BACKGROUND

FIG. 1 illustrates an example of a 5th Generation ("5G") network (also referred to as a new radio ("NR") network) including a network node 102 (e.g., a 5G base station ("gNB")), multiple communication devices 104 (also referred to as user equipment ("UE")).

Carrier aggregation ("CA") can be used in NR and LTE systems to improve UE transmit receive data rate. With CA, the UE can operate initially on a single serving cell called a primary cell ("PCell"). The PCell can be operated on a component carrier ("CC") in a frequency band. The UE can then be configured by the network with one or more secondary serving cells ("SCells"). Each SCell can correspond to a CC in the same frequency band (intra-band CA) or different frequency band (inter-band CA) from the frequency band of the CC corresponding to the PCell. For the UE to transmit/receive data on the SCells, for example, by receiving downlink shared channel ("DL-SCH") information on a physical downlink shared channel ("PDSCH") or by transmitting uplink shared channel ("UL-SCH") on a physical uplink shared channel ("PUSCH"), the SCells need to be activated by the network. The SCells can also be deactivated and later reactivated as needed via activation/deactivation signaling.

SUMMARY

According to some embodiments, a method of operating a communication device operating in a communications network and configured to communicate with a network node operating in the communications network via a primary cell, PCell, and a secondary cell, SCell is provided. The method includes receiving a configuration message from the network node indicating to monitor the SCell for first scheduling information associated with communications via the PCell. The method further includes, responsive to receiving the configuration message, receiving, via the SCell, the first scheduling information associated with communication via the PCell. The method further includes, responsive to receiving the configuration message, the communication device can monitor the SCell for the first scheduling information associated with communication via the PCell. The method further includes, responsive to receiving the configuration message, the communication device can monitor the PCell for second scheduling information associated with communication via the PCell.

According to other embodiments, a method of operating a network node operating in a communications network and configured to communicate with a communication device operating in the communications network via a primary cell, PCell, and a secondary cell, SCell is provided. The method includes transmitting a configuration message from the network node indicating to monitor the SCell for first scheduling information associated with communications via the PCell. The configuration message can indicate that the communication device monitor the SCell for the first scheduling information associated with communication via the PCell and that the communication device monitor the PCell for second scheduling information associated with communication via the PCell. The method further includes, responsive to transmitting the configuration message, transmitting, via the SCell, the first scheduling information associated with communication via the PCell.

According to other embodiments, a method of operating a communication device operating in a communications network and configured to communicate with a network node operating in the communications network via a primary cell, PCell, and a secondary cell, SCell is provided. The method includes receiving a first message from the network node. The first message can include an indication of cross-carrier scheduling between the PCell and the SCell. The method can further include receiving a second message from the network node. The second message can include a first search space set configuration with a first search space index. The method can further include receiving a third message from the network node. The third message can include a second search space set configuration with a second search space index. The second search space set can be linked to the first search space set and the second search space set configuration can include a first number of physical downlink control channel, PDCCH, candidates. The method can further include detecting a first PDCCH downlink control information, DCI, format by monitoring the first set of PDCCH candidates on the SCell. The method can further include communicating on the PCell that is scheduled by the detected first PDCCH DCI format.

According to other embodiments, a communication device, a network node, computer program, and/or computer program product is provided for performing one or more of the above methods.

Various embodiments described herein, enable a secondary cell ("SCell") to be used for scheduling physical downlink shared channel ("PDSCH")/physical uplink shared channel ("PUSCH") on a primary cell ("PCell"), which can improve control signaling capacity for a dynamic spectrum sharing ("DSS") scenario where the carrier used for operating the new radio ("NR") PCell is also used for serving long term evolution ("LTE") users resulting in limited opportunities for control channel transmission on the NR PCell.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
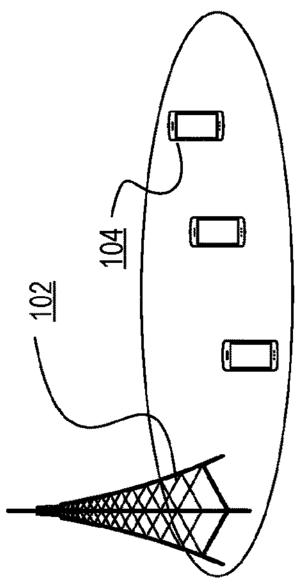
FIG. 1 is a schematic diagram illustrating an example of a $5^{th}$ generation ("5G") network.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For new radio ("NR") carrier aggregation ("CA"), cross-carrier scheduling ("CCS") can be specified using the following framework. First, a UE can have a primary serving cell ("PCell") and can be configured with one or more secondary serving cells ("SCells"). Second, for a given SCell with SCell index X, if the SCell is configured with a 'scheduling cell' with cell index Y (cross-carrier scheduling) the SCell X can be referred to as the 'scheduled cell;' the UE can monitor downlink ("DL") physical downlink control channel ("PDCCH") on the scheduling cell Y for assignments/grants scheduling physical downlink shared channel ("PDSCH")/physical uplink shared channel ("PUSCH") corresponding to SCell X; and the PDSCH/PUSCH corresponding to SCell X cannot be scheduled for the UE using a serving cell other than scheduling cell Y. Otherwise, the SCell X is the scheduling cell for SCell X (same-carrier scheduling); the UE can monitor DL PDCCH on SCell X for assignments/grants scheduling PDSCH/PUSCH corresponding to SCell X; and the PDSCH/PUSCH corresponding to SCell X cannot be scheduled for the UE using a serving cell other than SCell X. Third, a SCell cannot be configured as a scheduling cell for the primary cell. The primary cell is always its own scheduling cell.

Dual connectivity ("DC") can be used in NR and LTE systems to improve UE transmit receive data rate. With DC, the UE can operate a master cell group ("MCG") and a secondary cell group ("SCG"). Each cell group can have one or more serving cells. The MCG cell, operating on the primary frequency, in which the UE either performs the initial connection establishment procedure or initiates the connection re-establishment procedure is referred to as the PCell. The SCG cell in which the UE performs random access when performing the Reconfiguration with Sync procedure is referred to as the primary SCG cell ("PSCell").

In some examples, the term "primary cell" or "primary serving cell" can refer to PCell for a UE not configured with DC, and can refer to PCell of MCG or PSCell of SCG for a UE configured with DC.

In the 3$^{rd}$ Generation Partnership Project ("3GPP") NR standard, downlink control information ("DCI") is received over the PDCCH. The PDCCH may carry DCI in messages with different formats. DCI format 0_0, 0_1, and 0-2 are DCI messages used to convey uplink grants to the UE for transmission of the physical layer data channel in the uplink (PUSCH) and DCI format 1_0, 1_1, and 1-2 are used to convey downlink grants for transmission of the physical layer data channel in the downlink (PDSCH). Other DCI formats (2_0, 2_1, 2_2 and 2_3, etc) are used for other purposes such as transmission of slot format information, reserved resource, transmit power control information.

A PDCCH candidate can be searched within a common or UE-specific search space which is mapped to a set of time and frequency resources referred to as a control resource set ("CORESET"). The search spaces within which PDCCH candidates must be monitored are configured to the UE via radio resource control ("RRC") signaling. A monitoring periodicity can also be configured for different PDCCH candidates. In any particular slot the UE may be configured to monitor multiple PDCCH candidates in multiple search spaces, which may be mapped to one or more CORESETs. PDCCH candidates may be monitored multiple times in a slot, once every slot, or once in multiple of slots.

The smallest unit used for defining CORESETs is a Resource Element Group ("REG"), which can be defined as spanning 1 physical resource block ("PRB")×1 orthogonal frequency division multiplexing ("OFDM") symbol in frequency and time. Each REG can include demodulation reference signals ("DM-RS") to aid in the estimation of the radio channel over which that REG was transmitted. When transmitting the PDCCH, a precoder can be used to apply weights at the transmit antennas e.g. based on some knowledge of the radio channel prior to transmission. It is possible to improve channel estimation performance at the UE by estimating the channel over multiple REGs that are proximate in time and frequency if the precoder used at the transmitter for the REGs is not different. To assist the UE with channel estimation the multiple REGs can be grouped together to form a REG bundle and the REG bundle size for a CORESET can be indicated to the UE. The UE may assume that any precoder used for the transmission of the PDCCH is the same for all the REGs in the REG bundle. A REG bundle may include 2, 3, or 6 REGs.

A control channel element ("CCE") can include 6 REGs. The REGs within a CCE may either be contiguous or distributed in frequency. When the REGs are distributed in frequency, the CORESET can be referred to as using an interleaved mapping of REGs to a CCE and if the REGs are not distributed in frequency, a non-interleaved mapping can be used.

A PDCCH candidate may span 1, 2, 4, 8, or 16 CCEs. The number of aggregated CCEs used is referred to as the aggregation level for the PDCCH candidate.

A hashing function can be used to determine the CCEs corresponding to PDCCH candidates that a UE must monitor within a search space set. The hashing can be done differently for different UEs so that the CCEs used by the UEs are randomized and the probability of collisions between multiple UEs for which PDCCH messages are included in a CORESET is reduced.

Blind decoding of potential PDCCH transmissions can be attempted by the UE in each of the configured PDCCH candidates within a slot. The complexity incurred at the UE to do this depends on number of blind decoding attempts and the number of CCEs which need to be processed.

In order to manage complexity, limits on the total number of CCEs and/or total number of blind decodes to be processed by the UE can be used for BD/CCE partitioning based on UE capability for NR operation with multiple component carriers.

Various embodiments described herein enhance the CCS framework to allow a SCell to be used for scheduling PDSCH/PUSCH on the PCell.

In some embodiments, enhancements to CCS configuration signaling and PDCCH search space handling enable an SCell configured for the UE to be used for scheduling PDSCH/PUSCH on the primary cell.

In additional or alternative embodiments, configuration of PDCCH search space sets on the PCell and a special secondary cell ("sSCell") are linked. The linked search space sets can be used to switch the PDCCH monitoring of some PDCCH candidates from monitoring on sSCell when the sSCell is activated to monitoring on primary cell when sSCell is deactivated. The PDCCH candidates can be for scheduling PDSCH/PUSCH on primary cell.

In additional or alternative embodiments, a media access control ("MAC")/physical layer ("PHY") command can be provided to explicitly indicate the switching between monitoring on sSCell and monitoring on primary cell even when sSCell is activated.

In additional or alternative embodiments, a scheduling framework is introduced that avoids out-of-order scheduling of different PDSCHs/PUSCHs on primary cell scheduled using different PDCCHs on the primary cell and sSCell.

In additional or alternative embodiments, CCS configuration signaling can be used to configure an SCell as a 'sSCell that can schedule PDSCH/PUSCH on the PCell. In some examples, a carrier indicator field ("CIF") value can be provided to use for scheduling the primary cell as part of sSCell configuration.

Some embodiments herein enable an SCell to be used for scheduling PDSCH/PUSCH on the primary cell. Such functionality can be useful for improving control signaling capacity for a dynamic spectrum sharing ("DSS") scenario where the carrier used for operating the NR primary cell is also used for serving LTE users resulting in limited opportunities for control channel transmission on the NR primary cell.

Figure 10:
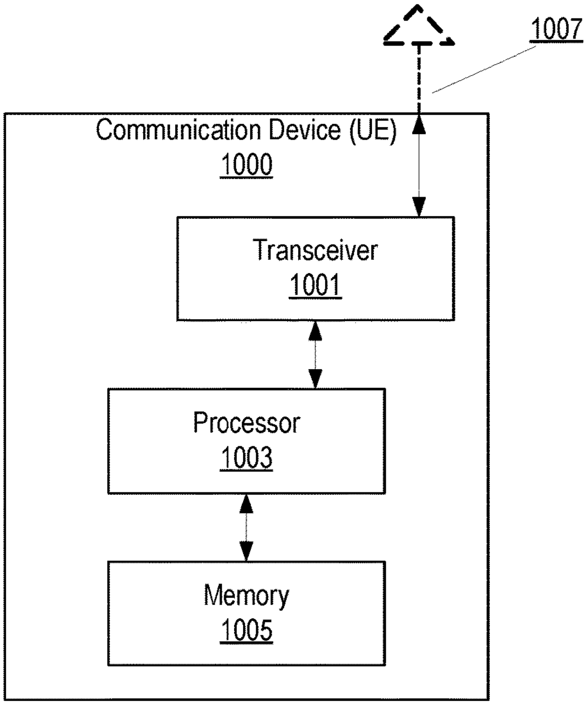
FIG. 10 is a block diagram illustrating an example of a communication device in accordance with some embodiments.

FIG. 10 is a block diagram illustrating elements of a communication device 1000 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 1000 may be provided, for example, as discussed below with respect to wireless device 4110 of FIG. 16.) As shown, communication device 1000 may include an antenna 1007 (e.g., corresponding to antenna 4111 of FIG. 16), and transceiver circuitry 1001 (also referred to as a transceiver, e.g., corresponding to interface 4114 of FIG. 16) including a transmitter and a receiver configured to provide uplink and downlink radio communications with a base station(s) (e.g., corresponding to network node 4160 of FIG. 16, also referred to as a RAN node) of a radio access network. Communication device 1000 may also include processing circuitry 1003 (also referred to as a processor, e.g., corresponding to processing circuitry 4120 of FIG. 16) coupled to the transceiver circuitry, and memory circuitry 1005 (also referred to as memory, e.g., corresponding to device readable medium 4130 of FIG. 16) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that separate memory circuitry is not required. Communication device 1000 may also include an interface (such as a user interface) coupled with processing circuitry 1003, and/or communication device UE may be incorporated in a vehicle.

As discussed herein, operations of communication device 1000 may be performed by processing circuitry 1003 and/or transceiver circuitry 1001. For example, processing circuitry 1003 may control transceiver circuitry 1001 to transmit communications through transceiver circuitry 1001 over a radio interface to a radio access network node (also referred to as a base station) and/or to receive communications through transceiver circuitry 1001 from a RAN node over a radio interface. Moreover, modules may be stored in memory circuitry 1005, and these modules may provide instructions so that when instructions of a module are executed by processing circuitry 1003, processing circuitry 1003 performs respective operations.

Figure 11:
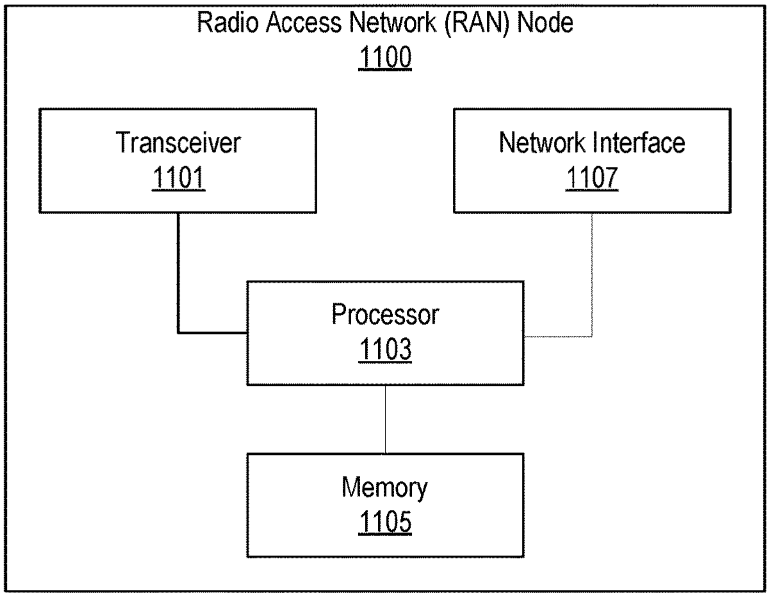
FIG. 11 is a block diagram illustrating an example of a radio access network ("RAN") node in accordance with some embodiments.

FIG. 11 is a block diagram illustrating elements of a radio access network ("RAN") node 1100 (also referred to as a network node, base station, eNodeB/eNB, gNodeB/gNB, etc.) of a Radio Access Network (RAN) configured to provide cellular communication according to embodiments of inventive concepts. (RAN node 1100 may be provided, for example, as discussed below with respect to network node 4160 of FIG. 16.) As shown, the RAN node 1100 may include transceiver circuitry 1101 (also referred to as a transceiver, e.g., corresponding to portions of interface 4190 of FIG. 16) including a transmitter and a receiver configured to provide uplink and downlink radio communications with mobile terminals. The RAN node 1100 may include network interface circuitry 1107 (also referred to as a network interface, e.g., corresponding to portions of interface 4190 of FIG. 16) configured to provide communications with other nodes (e.g., with other base stations) of the RAN and/or core network CN. The RAN node 1100 may also include processing circuitry 1103 (also referred to as a processor, e.g., corresponding to processing circuitry 4170) coupled to the transceiver circuitry, and memory circuitry 1105 (also referred to as memory, e.g., corresponding to device readable medium 4180 of FIG. 16) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the RAN node 1100 may be performed by processing circuitry 1103, network interface 1107, and/or transceiver 1101. For example, processing circuitry 1103 may control transceiver 1101 to transmit downlink communications through transceiver 1101 over a radio interface to one or more mobile terminals UEs and/or to receive uplink communications through transceiver 1101 from one or more mobile terminals UEs over a radio interface. Similarly, processing circuitry 1103 may control network interface 1107 to transmit communications through network interface 1107 to one or more other network nodes and/or to receive communications through network interface from one or more other network nodes. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to network nodes).

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 12:
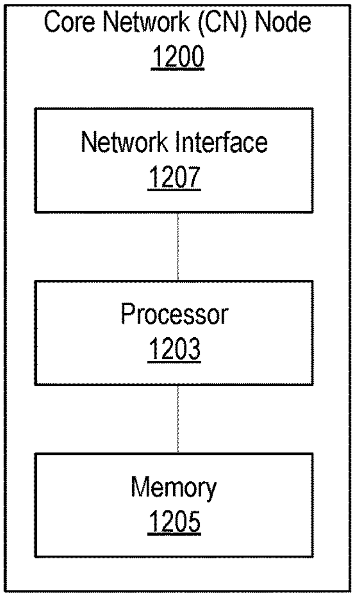
FIG. 12 is a block diagram illustrating an example of a core network ("CN") node in accordance with some embodiments.

FIG. 12 is a block diagram illustrating elements of a core network ("CN") node 1200 (e.g., an SMF node, an AMF node, an AUSF node, a UDM node, etc.) of a communication network configured to provide cellular communication according to embodiments of inventive concepts. As shown, the CN node 1200 may include network interface circuitry 1207 (also referred to as a network interface) configured to provide communications with other nodes of the core network and/or the RAN. The CN node 1200 may also include a processing circuitry 1203 (also referred to as a processor) coupled to the network interface circuitry, and memory circuitry 1205 (also referred to as memory) coupled to the processing circuitry. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that a separate memory circuitry is not required.

As discussed herein, operations of the CN node 1200 may be performed by processing circuitry 1203 and/or network interface circuitry 1207. For example, processing circuitry 1203 may control network interface circuitry 1207 to transmit communications through network interface circuitry 1207 to one or more other network nodes and/or to receive communications through network interface circuitry from one or more other network nodes. Moreover, modules may be stored in memory 1205, and these modules may provide instructions so that when instructions of a module are executed by processing circuitry 1203, processing circuitry 1203 performs respective operations.

Figure 2:
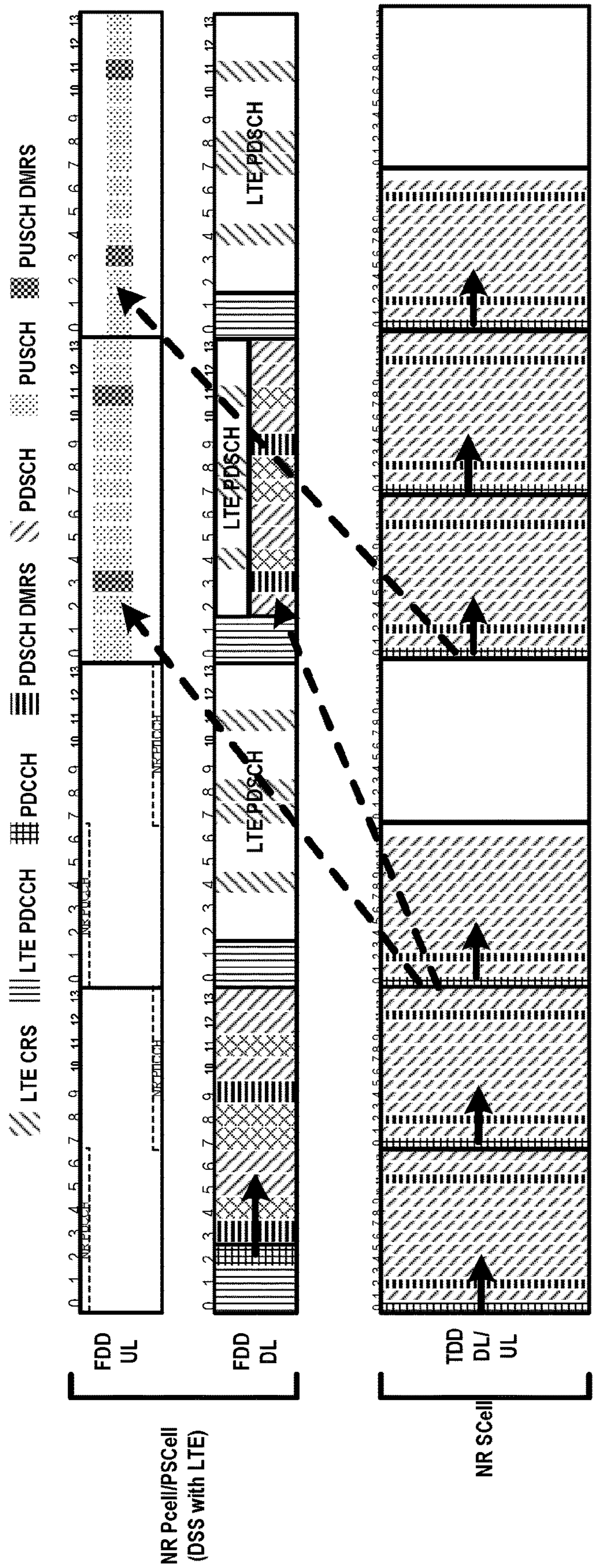
FIG. 2 is a diagram illustrating an example of a dynamic spectrum sharing ("DSS") scenario in accordance with some embodiments.

FIG. 2 illustrates a dynamic spectrum sharing ("DSS") scenario. In this example, slots are illustrated for a NR PCell/PSCell for a DL CA capable communication device (also referred to as user equipment ("UE")) operated on carrier where the same carrier is also used for serving LTE users via dynamic spectrum sharing. Slots are also illustrated for another NR SCell configured for the same UE As illustrated in FIG. 2, when a NR PCell is operated on the same carrier on which legacy LTE users are served, the opportunities for transmitting PDCCH are significantly limited due to the need to avoid overlap with LTE transmissions (e.g. LTE PDCCH, LTE PDSCH, LTE CRS).

For a UE supporting DL CA, providing the ability to use SCell PDCCH to schedule primary cell PDSCH/PUSCH (e.g. as shown by red arrows in the figure) can help in reducing the loading of primary cell PDCCH.

The example shown in FIG. 2 is for a CA scenario for a DL CA capable UE with NR primary cell on FDD carriers with 15 kHz SCS and NR SCell on TDD carrier with 30 kHz SCS. This is just one of the expected scenarios. Other scenarios (e.g. SCell being operated on FDD band) with 15 kHz SCS are also possible.

In some embodiments, to enable support of SCell scheduling PDSCH/PUSCH on primary cell, the existing NR CCS framework can be enhanced as described below. It some examples, a DL CA capable UE can be RRC configured with at least one SCell such that PDCCH on that SCell can schedule PUSCH and/or PDSCH on the primary cell. Such an SCell can be called e.g. a special SCell ("sSCell"). In additional or alternative examples, when UE is configured with sSCell, PDCCH on a primary cell can only schedule PDSCH/PUSCH transmissions on the primary cell (e.g., no CCS allowed from primary cell). In additional or alternative examples, when the UE is configured with sSCell, PDCCH on sSCell can schedule PDSCH/PUSCH on primary cell of the cell group (CG) of the sSCell; sSCell (e.g., sSCell cannot be a 'scheduled cell' for another cell); and other SCells in the same CG sSCell for which the sSCell is configured as a scheduling cell. In additional or alternative examples, the primary cell can be considered to have 'two scheduling cells' (e.g., the primary cell itself and the sSCell). Other serving cells can only have one scheduling cell.

The above conditions can reduce sSCell operation without reducing flexibility. For example, the sSCell may reduce PDCCH load on primary cell and the support of CCS from a primary cell would only increase PDCCH load. So, such combination may not be required when a sSCell is configured.

In additional or alternative embodiments, when a UE is configured with a sSCell, in a given primary cell slot, unicast PDSCH (e.g., scheduled via PDCCH with DCI CRC scrambled by one of C-RNTI, MCS-CRNTI, CS-RNTI) is scheduled from either the primary cell or the sSCell but not both.

In additional or alternative embodiments, when a UE is configured with a sSCell, in a given primary cell slot, unicast PUSCH (e.g., scheduled via PDCCH with DCI CRC scrambled by one of C-RNTI, MCS-CRNTI, CS-RNTI) is scheduled from either the primary cell or the sSCell but not both.

In additional or alternative embodiments, when a UE is configured with a sSCell, if PDCCH (PDCCH1) of primary cell schedules a PDSCH (PDSCH1) on the primary cell, then another PDCCH on sSCell (PDCCH2) starting (or alternately ending) after PDCCH1 should not schedule another PDSCH (PDSCH2) that starts before end of (or alternately before start of) PDSCH1. For example, if a PDCCH (PDCCH1) on primary cell ending in symbol i1 of the primary cell schedules a PDSCH (PDSCH1) on the primary cell, then a PDCCH (PDCCH2) on sSCell ending in symbol i2 of the sSCell should not schedule a PDSCH (PDSCH2) on the primary cell that starts earlier than the end of PDSCH1 if end of symbol i2 is later in time than end of symbol i1. In some examples, these conditions are applied when PDSCH1 is associated with a first hybrid automatic repeat request ("HARQ") process ID and PDSCH2 is associated with a second HARQ process ID. The first and second HARQ process IDs can be same or different. In additional or alternative examples, these conditions are not applied when either PDSCH1 or PDSCH2 is not associated with a HARQ process ID.

In additional or alternative embodiments, when a UE is configured with a sSCell, if PDCCH (PDCCH1) of primary cell schedules a PUSCH (PUSCH1) on the primary cell, then another PDCCH on sSCell (PDCCH2) starting (or alternately ending) after PDCCH1 should not schedule another PUSCH (PUSCH2) that starts before end of (or alternately before start of) PUSCH1 For example, if a PDCCH (PDCCH1) on primary cell ending in symbol i1 of the primary cell schedules a PUSCH (PUSCH1) on the primary cell, then a PDCCH (PDCCH2) on sSCell ending in symbol i2 of the sSCell should not schedule a PUSCH (PUSCH2) on the primary cell that starts earlier than the end of PUSCH1 if end of symbol i2 is later in time than end of symbol i1. In some examples, these conditions are applied when PUSCH1 is associated with a first HARQ process ID and PUSCH2 is associated with a second HARQ process ID. The first and second HARQ process IDs can be same or different. In additional or alternative examples, these conditions are not applied when either PUSCH1 or PUSCH2 is not associated with a HARQ process ID In additional or alternative embodiments, when a UE is configured with a sSCell, the above conditions can avoid 'out-of-order' scheduling combinations between primary cell and sSCell to help reduce UE complexity.

Figure 3:
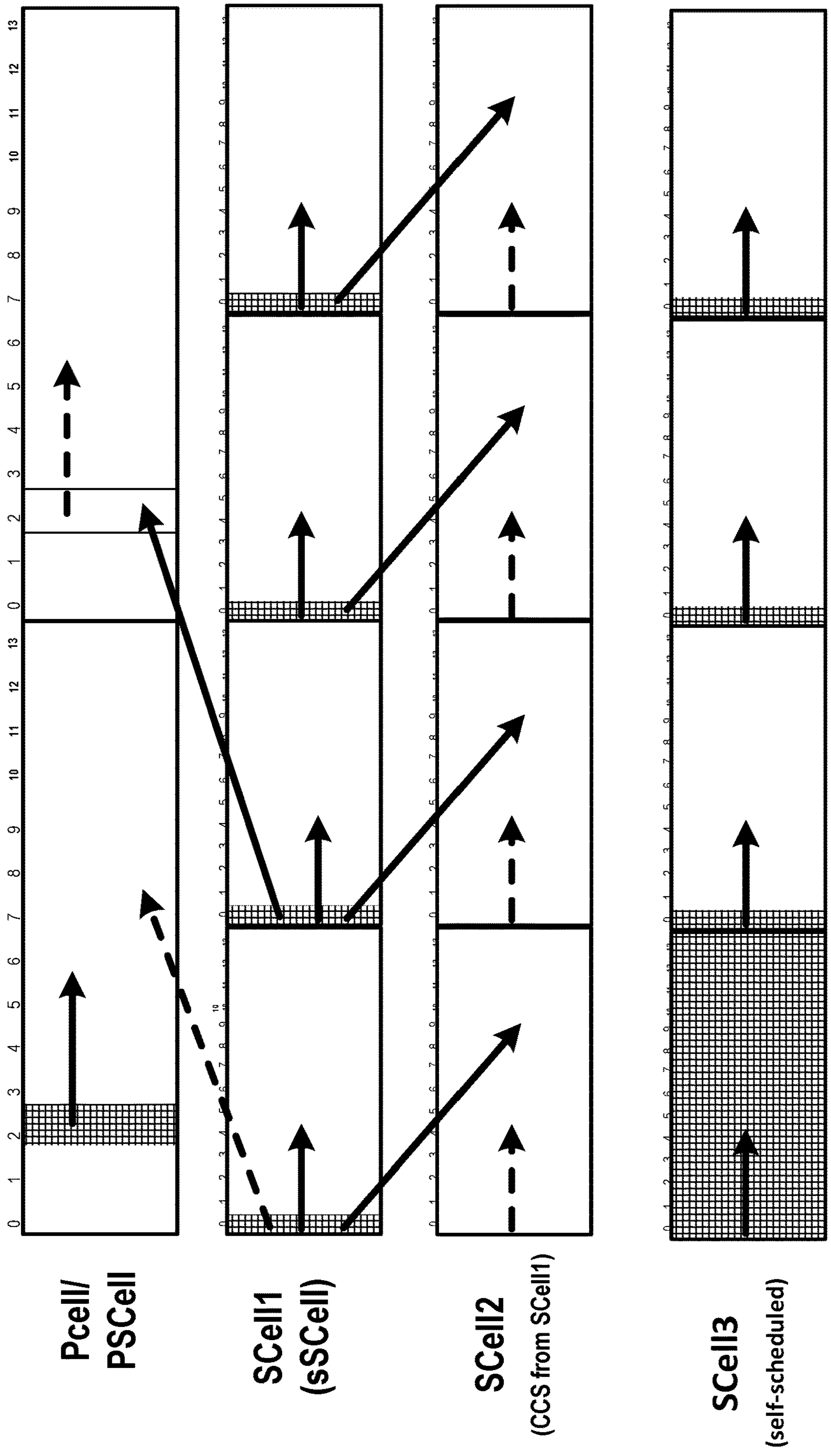
FIGS. 3-4 are diagrams illustrating examples of a framework for enhanced cross-carrier scheduling ("CCS") with a special secondary cell ("sSCell") in accordance with some embodiments.
Figure 4:
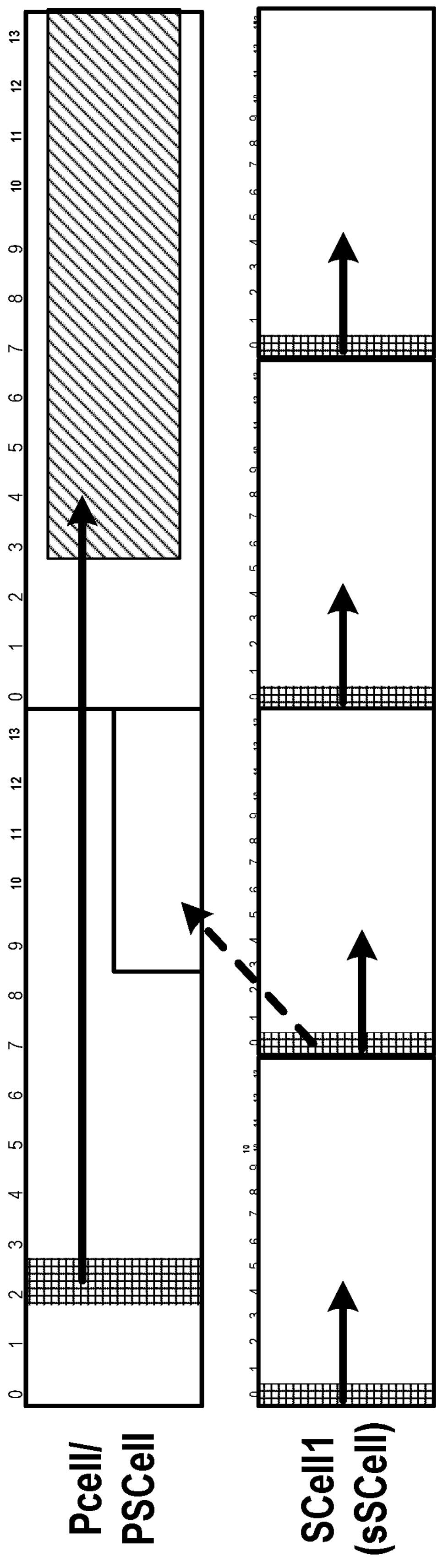

FIGS. 3-4 illustrate the above conditions for some example scenarios. In FIGS. 3-4, the solid arrows indicate allowed (PDCCH→PDSCH/PUSCH) scheduling possibility while dashed arrows indicate disallowed possibilities.

With current CCS framework, a minimum scheduling delay may be specified between the end of PDCCH transmission of the scheduling cell and a beginning of a corresponding PDSCH/PUSCH transmission on the scheduled cell, for the case when SCS (sub-carrier spacing) of the PDCCH transmission ($\mu_{PDCCH}$) is different from the SCS of corresponding PDSCH transmission ($\mu_{PDSCH}$), a duration of at least 4 PDCCH symbols for 15 kHz PDCCH SCS spacing and 5 PDCCH symbols with 30 kHz SCS spacing can be provided between an end of PDCCH and a beginning of PDSCH (beginning of PDSCH slot if $\mu_{PDCCH}<\mu_{PDSCH}$).

In some embodiments, for the enhanced CCS framework with PDCCH DCI on sSCell scheduling PDSCH on primary cell, if the SCS of the PDCCH is different from the SCS of the scheduled PDSCH, either same or slightly larger minimum scheduling delay between sSCell PDCCH and primary cell PDSCH can be used. The minimum scheduling delay between sSCell PDCCH and primary cell PDSCH may be pre-defined, configured by upper layers, or indicated by UE via UE capability signaling.

In some embodiments, a UE configured with a primary cell and one or more secondary serving cells (SCells) can perform operations. The operations can include monitoring a first set of PDCCH candidates on the primary cell for DCI formats that schedule PDSCH receptions and/or PUSCH transmissions for the primary cell. The operations can further include receiving a first higher layer configuration that a first SCell (special SCell or sSCell) of the one or more SCells can be used for monitoring PDCCH candidates that schedule PDSCH receptions or PUSCH transmissions on the primary cell.

The operations can further include, in response to receiving the higher layer configuration, monitoring a second set PDCCH candidates on the sSCell for DCI formats that schedule PDSCH receptions and/or PUSCH transmissions on the primary cell. The operations can further include, in response to receiving the higher layer configuration, monitoring a third set of PDCCH candidates on the sSCell for DCI formats that schedule PDSCH receptions and/or PUSCH transmissions for the sSCell. The operations can further include, in response to receiving the higher layer configuration, continuing to monitor at least a subset of PDCCH candidates of the first set of PDCCH candidates for DCI formats that schedule PDSCH receptions and/or PUSCH transmissions on the primary cell.

In additional or alternative embodiments, the first higher layer configuration is received only if the UE is not configured to monitor PDCCH candidates on the primary cell that schedule PDSCH receptions or PUSCH transmissions for any of the one or more SCells.

In additional or alternative embodiments, the operations can further include detecting a first DCI format with CRC scrambled by C-RNTI scheduling a first PDSCH reception in a first set of symbols of the primary cell by monitoring the at least subset of PDCCH candidates of the first set of PDCCH candidates. The operations can further include, detecting a second DCI format with CRC scrambled by C-RNTI scheduling a second PDSCH reception in a second set of symbols of the primary cell by monitoring the second set of PDCCH candidates. The operations can further include, receiving both first PDSCH and second PDSCH only if the first set of symbols and second set of symbols are not overlapping.

In additional or alternative embodiments, the operations can further include receiving the first PDSCH and the discarding the second PDSCH or the second DCI format if the first set of symbols and second set of symbols are overlapping. In some examples, the primary cell scheduled PDSCH can be prioritized, in case the collision handling also needs to be specified for the UE.

In additional or alternative embodiments, the operations can further include detecting a first DCI format with CRC scrambled by C-RNTI by monitoring the at least subset of PDCCH candidates of the first set of PDCCH candidates, with corresponding PDCCH reception of the first DCI format ending in a first symbol of the primary cell, and the first DCI format scheduling a first PDSCH reception for the primary cell. The operations can further include detecting a second DCI format with CRC scrambled by C-RNTI by monitoring the second set of PDCCH candidates, with corresponding PDCCH reception of the second DCI format ending in a second symbol of the sSCell where the end of the first symbol is earlier than the end of the second symbol, and the second DCI format scheduling a second PDSCH reception for the primary cell. The operations can further include receiving both first PDSCH and second PDSCH only if the second PDSCH starts after the end of the first PDSCH. In some examples, similar operations are possible for a PUSCH transmission. In determining the relative timing relationships (A is earlier than end of B, etc), the received timing difference between signals/channels received on different carriers can be considered explicitly or may be assumed to be zero.

In additional or alternative embodiments, the operations can further include receiving the first PDSCH and discarding the second PDSCH or the second DCI format if the second PDSCH starts earlier or at the same time as the end of first PDSCH. In some examples, the primary cell scheduled PDSCH can be prioritized in case the collision handling also needs to be specified for the UE.

In additional or alternative embodiments, the primary cell and the one or more secondary serving cells (SCells) are part of either a master cell group (MCG) or a secondary cell group (SCG), and the primary cell is the primary cell (PCell) of the MCG and the primary SCG cell (PSCell) of the SCG.

In additional or alternative embodiments, the second set of PDCCH candidates belong to a UE-specific search space configured for the sSCell. In some examples, the at least subset of PDCCH candidates of the first set of PDCCH candidates belong to a common search space configured for the primary cell. In additional or alternative examples, configured for the sSCell can include being configured as part of RRC configuration of the sSCell and configured for the primary cell can include being configured as part of RRC configuration of the primary cell.

In additional or alternative embodiments, the second set of PDCCH candidates belong to a UE-specific search space configured for the sSCell. In some examples, the at least subset of PDCCH candidates of the first set of PDCCH candidates belong to a UE-specific search space configured for the primary cell In additional or alternative embodiments, at least one DCI format that schedules PDSCH receptions and/or PUSCH transmissions on the primary cell includes a carrier indicator field.

Figure 5:
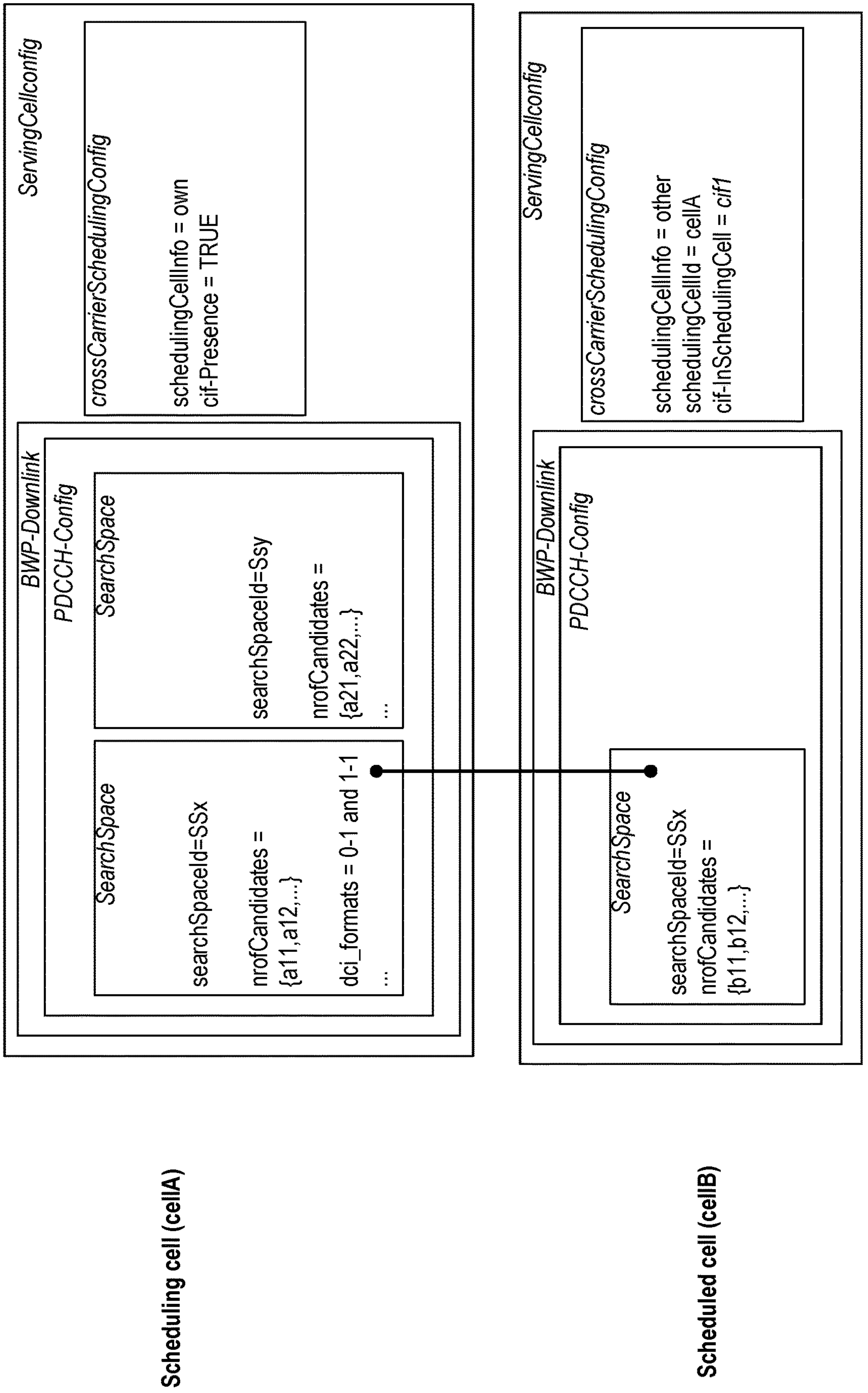
FIG. 5 is a block diagram illustrating an example of search space handling with a CCS framework.

FIG. 5 illustrates an example of a handling PDCCH search space sets (SS) in a CCS framework in which the UE is configured with cross-carrier scheduling with cell A as scheduling cell and cell B as scheduled cell.

For scheduled cell B, as part of CCS configuration, the UE is configured with a parameter schedulingCellInfo set to value 'other;' a parameter schedulingCellId, indicating cell index of the scheduling cell i.e., cell index of cell A; and a parameter cif-InSchedulingCell, i.e., the carrier indicator field (CIF) value (e.g. cif1) to be indicated in PDCCH DCI of cell A when PDSCH/PUSCH of cell B has to be scheduled. For scheduled cell B, as part of SS configuration, the UE is configured with one or more SS sets each with a SS index (e.g. SSx) and a corresponding number of PDCCH monitoring candidates (e.g. b11 candidates for aggregation level L=1, b12 for L=2, . . . ) as part of cell B configuration.

For scheduling cell A, as part of CCS configuration, the UE is configured with a parameter schedulingCellInfo set to value 'own;' and a parameter cif-Presence set to TRUE indicating presence of CIF field in PDCCH DCI. For scheduling cell A, as part of SS configuration, the UE is configured with at least one SS set with same SS index as that configured for the scheduled cell, i.e., SSx. The UE may be configured with a non-zero number of PDCCH candidates (e.g. a11 candidates for aggregation level L=1, a12 for L=2, . . . ) for SSx as part of cell A configuration.

For monitoring PDCCH on cell A using SSx, the UE monitors the b11, b12, . . . PDCCH candidates with DCI format size determined according to cell B configuration and it detects a PDCCH DCI with CIF=cif1, it determines that the corresponding DCI format is for a PDSCH/PUSCH on Cell B (cross-carrier scheduling). The UE monitors the a11, a12, . . . PDCCH candidates with DCI format size determined according to cell A configuration and if it detects a PDCCH DCI with CIF=0, it determines that the corresponding DCI format is for a PDSCH/PUSCH on Cell A (same-carrier scheduling or self-scheduling). In case the UE is configured with multiple DL bandwidth parts ("BWPs") for the scheduling cell and/or scheduled cell, the UE applies the search space for the scheduled cell only if the DL BWPs in which the linked search spaces are configured in scheduling cell and scheduled cell are both active.

In some examples, in current CCS mechanism, the search spaces in scheduled cell and scheduling cell may be linked to each other by having same searchSpaceId (e.g. SSx above). In additional or alternative examples, when CCS is configured there is no PDCCH monitoring on the scheduled cell. A SCell cannot be configured as a scheduling cell for the primary cell and the primary cell is always its own scheduling cell.

In some embodiments, for enhanced CCS framework using sSCell, a particular SCell should be configured as a sSCell for the UE. This can be done by including a RRC IE as part of ServingCellconfig (e.g. as part of CCS configuration) of the SCell. The RRC IE can be a Boolean indication with TRUE implying the SCell is configured as sSCell. In additional or alternative embodiments, search space handling can be according to one or more of the options 1, 2, 2a, and 2b discussed below.

Option 1 for search space handling is discussed below.

Figure 6:
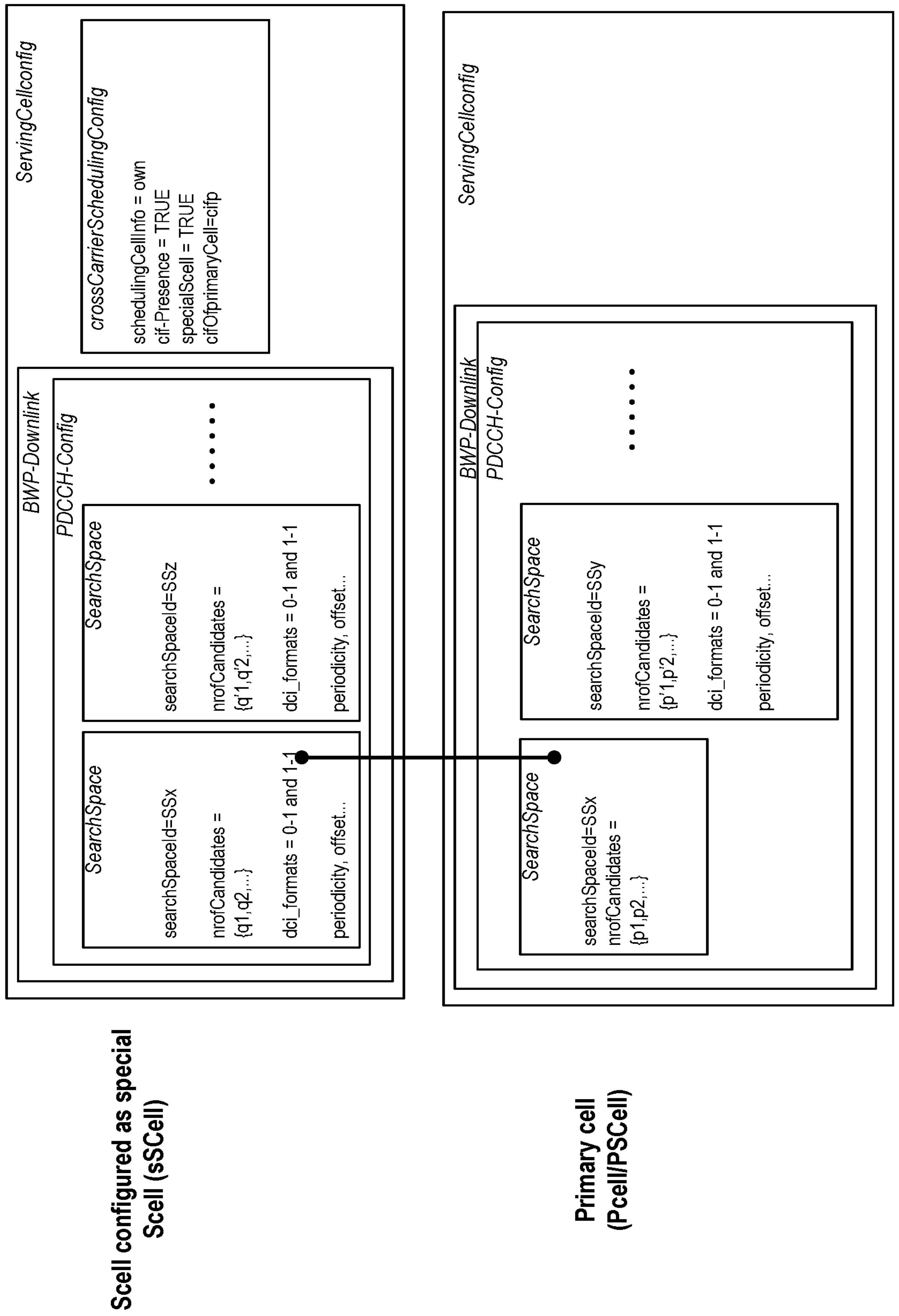
FIG. 6 is a block diagram illustrating an example of search space configuration with an enhanced CCS framework in accordance with some embodiments.

For SS handling, one option (Option 1) is to extend the current SS index based linking approach with some modifications as described and illustrated in FIG. 6.

In some embodiments, primary cell and sSCell can be configured with search space sets with same search space index value e.g. search space with index SSx (SSx). For SSx configuration of primary cell, in addition to search space index, at least the IE indicating number of PDCCH monitoring candidates (e.g. p1, p2, . . . for aggregation level 1, 2, . . . respectively) is configured. For SSx configuration of sSCell, IEs indicating controlResourceSetID, the periodicity, offset and duration of search space monitoring slots, DCI formats for the SS, and number of PDCCH monitoring candidates (e.g. q1, q2, . . . for aggregation level 1, 2, . . . respectively) are configured.

In additional or alternative embodiments, primary cell can be configured with other search space sets with SS index values (e.g. SSy) that are not configured for the sSCell. In additional or alternative embodiments, sSCell can be configured with other search space sets with SS index values (e.g. SSz) that are not configured for the primary cell.

In additional or alternative embodiments, if the active BWPs of the primary cell and sSCell each have a search space set configured with same search space index (e.g. SSx above) then the UE does not monitor the PDCCH candidates corresponding to SSx on the primary cell. For SSx on sSCell, the UE monitors p1, p2, . . . PDCCH candidates on the sSCell using the DCI format size determined according to primary cell configuration (cross-carrier scheduling from sSCell to primary cell) and/or the UE monitors q1, q2, . . . PDCCH candidates on the sSCell using the DCI format size determined according to sSCell configuration (same carrier scheduling on sSCell). The UE monitors PDCCH candidates corresponding to SSy on primary cell (same carrier scheduling on primary cell). The UE monitors PDCCH candidates corresponding to SSz on sSCell (same carrier scheduling on sSCell using another search space).

In additional or alternative embodiments, the PDCCH candidates corresponding to SSx on the primary cell are not monitored when sSCell is configured but deactivated (i.e., via MAC CE based deactivation command) or when the active BWP of the sSCell is switched to a BWP (e.g. a dormant BWP) not configured with a SS with same index as that of primary cell, i.e., SSx.

In additional or alternative embodiments, if the sSCell is removed (i.e., RRC releases the configuration of sSCell for the UE), then the UE primary cell configuration is updated to either remove SSx configuration of the primary cell, or it is reconfigured to include other IEs indicating controlResourceSetID, the periodicity, offset and duration of search space monitoring slots, DCI formats for monitor for the SS etc. in which case the UE can start monitoring SSx candidates on the primary cell.

FIG. 5 illustrates an example of the above option. In FIG. 5, the on/off configuration of 'special SCell' is included as part of CCS configuration of the SCell to be used as sSCell. Also, the CIF value to use in the PDCCH DCI formats scheduling PDSCH/PUSCH for primary is included as part of sSCell CCS configuration. This removes the need for providing a CCS configuration in the primary cell and is also more scalable in cases where multiple sSCells are configured for the UE.

In some embodiments, a CCS configuration can be provided in the primary cell and the CIF value(s) to be used in sSCell(s) to schedule PDSCH/PUSCH on primary cell can be configured as part of primary cell CCS configuration. If the CIF configuration is provided on the primary cell, the scheduling Cell information can be set to 'sSCell' (e.g. the schedulingCellId set to serving cell index of the SCell to be used as sSCell) implying both sSCell and the primary cell can schedule PDSCH/PUSCH on the primary cell. Alternately, this can be explicitly indicated.

For example, CrossCarrierScheduling IE can be included in both in the primary cell and in the sSCell and set as below. Further it can be specified (without additional signaling) that in a primary cell configured with "schedulingCellInfo-> other" the UE shall also monitor PDCCH on the primary cell for DCI formats that schedule PDSCH/PUSCH on the primary cell.

```
In primary cell:
CrossCarrierSchedulingConfig {
  schedulingCellInfo {
    other {
      schedulingCellId X (ID of sSCell),
      cif-InSchedulingCell Y (e.g. 1)
    }
  }
}
In SCell that schedules PDSCH/PUSCH on primary cell (i.e., sSCell):
CrossCarrierSchedulingConfig {
  schedulingCellInfo {
    own {
      cif-Presence true
    }
  }
}
```

[0001] As another example, CrossCarrierScheduling IE can be included in both in the primary cell and in the sSCell and set as below. Further it can be specified (without additional signaling) that in a primary cell configured with "schedulingCellInfo-> sSCell" the UE shall also monitor PDCCH on the primary cell for DCI formats that schedule PDSCH/PUSCH on the primary cell.

```
In primary cell:
CrossCarrierSchedulingConfig {
  schedulingCellInfo {
    sSCell {
      sSCellId X (ID of sSCell),
      cif-InsSCell Y (e.g. 1)
    }
  }
}
In SCell that schedules PDSCH/PUSCH on primary cell (i.e., sSCell):
CrossCarrierSchedulingConfig {
  schedulingCellInfo {
    own {
      cif-Presence true
    }
  }
}
```

Option 2 for search space handling is discussed below.

In some examples, when sSCell is not configured for the UE, then with current framework (i.e., no CCS from SCell to PCell), say a UE is able to handle:

X1=32 PDCCH BDs per slot of primary cell with same-carrier scheduling

X2=32 PDCCH BDs per slot of SCell with same carrier scheduling and the total PDCCH budget that UE hardware needs to be provisioned for is X1+X2=64 BDs.

When sSCell is configured for the UE, one approach is to configure the PDCCH candidates such that:

X1=32 PDCCH BDs are needed for SSx, configured on the primary cell

Y1=32 PDCCH BDs are needed for SSy, configured on the primary cell

X2=32 PDCCH BDs are needed for SSx, configured on the sSCell

With the above set up, UE has to monitor:

Y1=32 BDs on primary cell and X1+X2=64 BDs on sSCell when sSCell is activated and Y1=32 BDs on primary cell when sSCell is deactivated This option can ensure that regardless of sSCell status, at least 32 BDs are available for primary cell scheduling but the total PDCCH budget that UE hardware needs to be provisioned for is X1+X2+Y1=96 BDs which can result in higher UE complexity.

In additional or alternative examples, another approach is configuring the PDCCH candidates such that:

X1=16 PDCCH BDs are needed for SSx configured on primary cell

Y1=16 PDCCH BDs are needed for SSy configured on primary cell

X2=32 PDCCH BDs are needed for SSx configured on sSCell With above set up, UE has to monitor:

Y1=16 BDs on primary cell and X1+X2=48 BDs on sSCell when sSCell is activated and Y1=16 BDs on primary cell when sSCell is deactivated This option can ensure that the total PDCCH budget that UE hardware needs to be provisioned for is X1+X2+Y1=64 BDs keeping same UE complexity as without sSCell. However, when sSCell is deactivated, only 16 BDs are available for the primary cell and RRC reconfiguration of SSx (or RRC reconfiguration of more PDCCH candidates in SSy) may be needed to increase the PDCCH BDs.

Option 2 discussed below addresses the above issue by allowing the reallocation of PDCCHs BDs to primary cell without need for RRC reconfiguration. In some examples, the same principle as for BD handling can be applied for CCE budget handling.

In some embodiments, when sSCell is configured at least one search space set (e.g. with index SSa) configured for primary cell is linked with that of a search space set configured for the sSCell. In some examples, the linking can be defined to be implicit like in option 1, i.e., if both primary cell and sSCell are configured with search space sets with same SS index they are considered linked. In additional or alternative examples, the linking can be defined to be explicit. For example, search space set with index SSa in primary cell is considered linked with search space set with index SSa on sSCell when (e.g. only if) an RRC parameter included as part of configuration search space set SSa of primary cell indicates that this search space set is linked to sSCell. The explicit linking approach can provide more flexibility in allocation of SS index values for primary cell and sSCell without automatically linking every common SS index between them. Full search space set configuration can be provided on both primary cell and sSCell even for the linked search space sets. So, for both primary cell and sSCell search space sets with index SSa, IEs indicating controlResourceSetID, the periodicity, offset and duration of search space monitoring slots, DCI formats for the SS, are configured. The number of PDCCH monitoring candidates can be configured independently for both cells. e.g. p1, p2, . . . for aggregation level 1, 2, . . . respectively are configured as part of primary cell SSa configuration, and q1, q2, . . . for aggregation level 1, 2, . . . respectively are configured as part of secondary cell SSa configuration.

In additional or alternative embodiments, when sSCell is activated and the active BWPs of sSCell and primary cell have linked search space sets (i.e., SSa on primary cell and SSa on sSCell) the UE does not monitor the PDCCH candidates corresponding to SSa on the primary cell. In some examples, for SSa on sSCell, the UE monitors p1, p2, . . . PDCCH candidates on the sSCell using the DCI format size determined according to primary cell configuration (cross-carrier scheduling from sSCell to primary cell). In additional or alternative examples, for SSa on sSCell, the UE monitors q1, q2, . . . PDCCH candidates on the sSCell using the DCI format size determined according to sSCell configuration (same carrier scheduling on sSCell).

In additional or alternative embodiments, when sSCell is deactivated (i.e., via MAC CE based SCell deactivation command), the UE does not monitor any PDCCH candidates on the sSCell. For SSa on primary cell, the UE monitors p1, p2, . . . PDCCH candidates on the primary cell using the DCI format size and other search space parameters determined according to primary cell configuration (same carrier scheduling on primary cell).

In additional or alternative embodiments, the behavior above can also be applied if the sSCell is activated but the active BWP is set to a BWP (e.g. dormant BWP) without a linked search space set to the primary cell and/or if the sSCell is removed (i.e., RRC releases the configuration of sSCell for the UE).

In additional or alternative embodiments, the primary cell can be configured with other search space sets with SS index values (e.g. SSy) that are not linked with the sSCell and the sSCell can be configured with other search space sets with SS index values (e.g. SSz) that are not linked with the primary cell.

FIG. 6 illustrates an example of the search space configuration with enhanced CCS framework using option 2. As illustrated in FIG. 6, full search space configuration can be provided for SSa in primary cell and sSCell. The explicit linking approach is illustrated, for example, the search space sets with index SSa are linked between primary cell and sSCell via explicit RRC parameter linkedTosSCell=TRUE in primary cell configuration while search space sets SSb are not linked even when they have same search space index.

Figure 7:
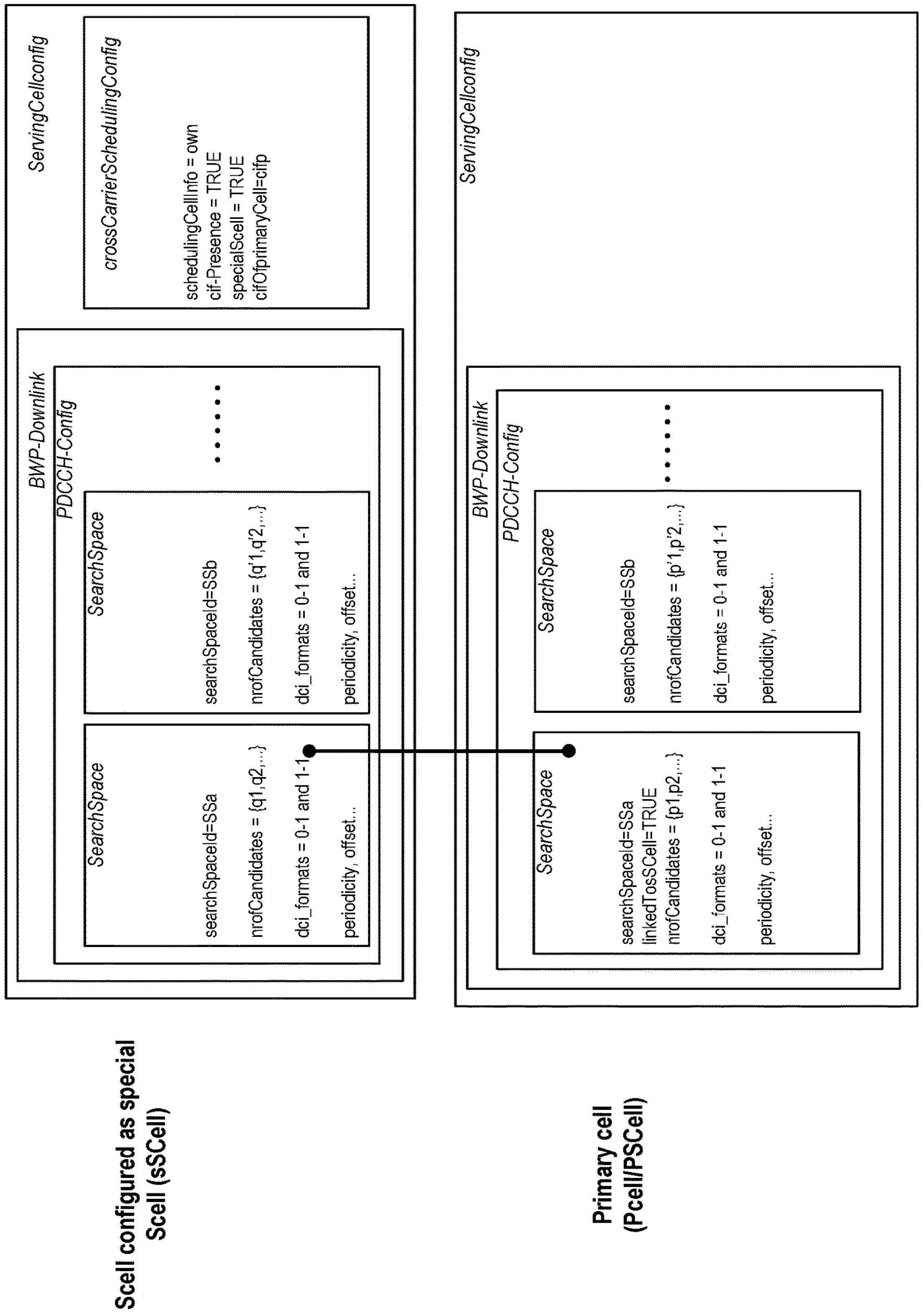
FIG. 7 is a block diagram illustrating another example of search space configuration with an enhanced CCS framework in accordance with some embodiments.

FIG. 7 illustrates an example of search space switching based on sSCell deactivation using option 2. As illustrated, the linked search space set SSa (linking indicated by *), is monitored by UE on sSCell when sSCell is activated and when it is deactivated, the UE starts monitoring SSa on primary cell according to configuration for the primary cell. The search space sets SSb and SSy on primary cell are not linked to sSCell and they are monitored (i.e., the PDCCH candidates corresponding to them are monitored independent of sSCell status. The search space sets SSb and SSz on sSCell are not linked to primary cell and they are monitored when sSCell is activated and not monitored when it is deactivated. Shading in FIG. 7 indicates monitored and unshaded indicates not monitored.

Option 2a for search space handling is discussed below.

In some embodiments, Option 2 can be made more flexible by introducing additional MAC CE or L1 based signaling as follows. For a UE configured with sSCell, a search space set on primary cell and a search space set on sSCell are linked using one of the approaches described for Option 2 (e.g. the linked search space sets with index SSa as described above).

In additional or alternative embodiments, when sSCell is activated and the active BWPs of sSCell and primary cell have linked search space sets, the UE determines whether to use the linked search space set on primary cell or the linked search space set on sSCell based on an explicit 'sSCell monitoring indication' (SMI) command indicating which serving cell's search space set to use. In some examples, this allows switching some PDCCH monitoring candidates between primary cell and sSCell in a more dynamic manner e.g. responsive to changing radio conditions, traffic load.

In additional or alternative embodiments, the sSCell monitoring command can be sent via MAC layer signaling as a MAC CE command or via L1 signaling (e.g. as part of PDCCH DCI sent on either the primary cell or the sSCell using e.g. a non-linked search space set). If UE detects the command and a bit in the command is set to first state (e.g. 1), the UE starts monitoring the PDCCH candidates corresponding to linked search space set on sSCell for PDSCH/PUSCH scheduling assignments/grants for primary cell (cross-carrier scheduling) and the UE does not monitor PDCCH candidates corresponding to linked search space set on primary cell. If UE detects the command and a bit in the command is set to second state (e.g. 0), the UE starts monitors the PDCCH candidates corresponding to linked search space set on primary cell for PDSCH/PUSCH scheduling assignments/grants for primary cell (same-carrier scheduling) and the UE does not monitor PDCCH candidates corresponding to linked search space set on sSCell. If multiple SCells are configured as sSCell, multiple bits e.g. one per sCell can be included in the command. A default state can be used (e.g. monitor the PDCCH candidates corresponding to linked search space set on sSCell or alternately primary cell) to define the UE behavior for cases where UE has not yet received any SMI command.

In additional or alternative embodiments, if the sSCell is deactivated/switched to dormant BWP/removed, a similar approach as Option 2 can be used.

Figure 8:
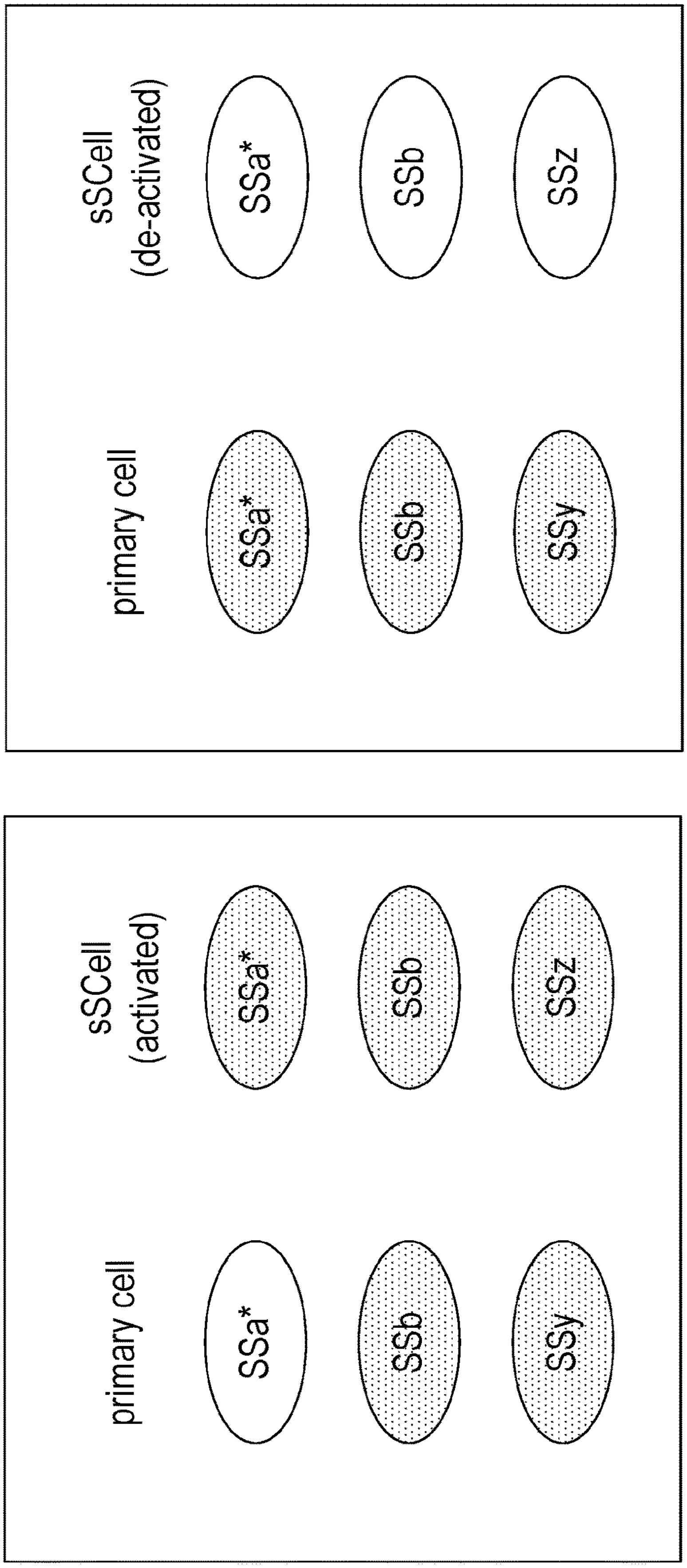
FIG. 8 is a block diagram illustrating an example of search space switching based on sSCell deactivation in accordance with some embodiments.
Figure 9:
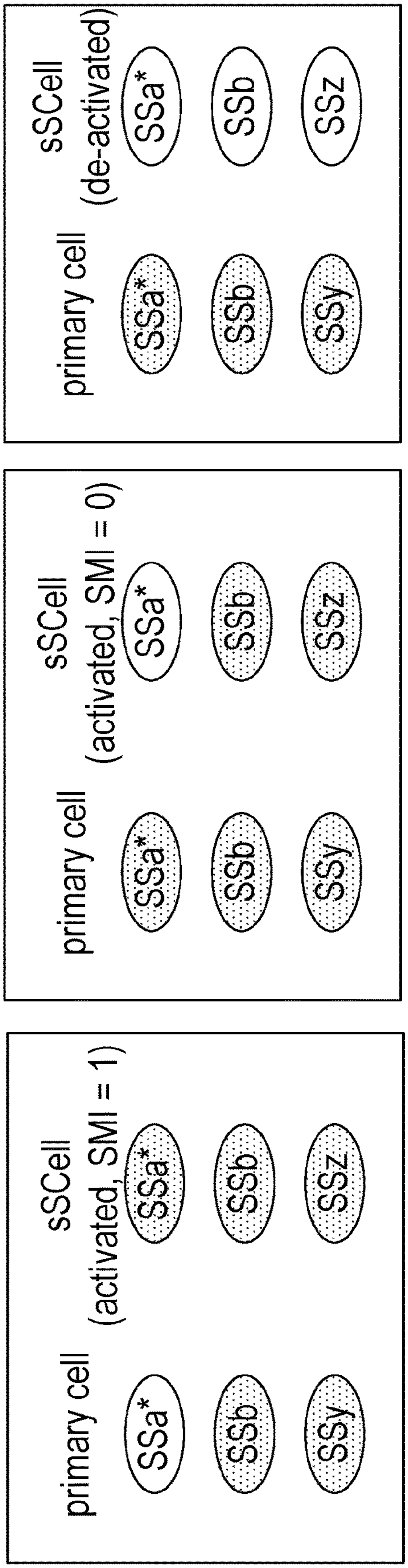
FIG. 9 is a block diagram illustrating an example of search space switching based on sSCell monitoring indication ("SMI") in accordance with some embodiments.

FIG. 8 illustrates an example of the switching of linked search space sets between primary cell and sSCell using SMI command. As shown in FIG. 8, the linked search space set SSa (linking indicated by *), is monitored by UE on sSCell when sSCell is activated and SMI=1. When sSCell is deactivated, or activated but SMI=0, the UE starts monitoring SSa on primary cell according to configuration for the primary cell.

In some embodiments, the UE may switch/change the search space sets monitored for/on the primary cell upon change in the activation/deactivation of the sSCell. A switching/change delay may be specified e.g. upon reception of a MAC activation command in slot n, the UE monitors the search space sets on the sSCell for scheduling the primary cell starting from a slot relative to slot n based on predetermined delay, for example, the delay can be 3 ms after the slot in which an acknowledgement ("ACK") is transmitted for the MAC activation command. Similarly, upon sSCell deactivation MAC command CE in slot n, the UE stops monitoring the search space sets on the sSCell for scheduling the primary cell starting from a slot relative to slot n based on predetermined delay, for example, the delay can be 3 ms after the slot in which an ACK is transmitted for the MAC deactivation command. If sSCell deactivation occurs due to expiry of the sSCell deactivation timer, then the UE stops monitoring the search space sets on the sSCell for scheduling the primary cell starting from a slot relative to slot n based on predetermined delay, for example, the delay can be 4 ms after the slot in which the Scell deactivation timer expires.

Option 2b for search space handling is discussed below.

In some embodiments, this Option is similar to Option 2a. However, instead of (or in addition to) the explicit SMI command, the UE may determine whether to use the linked search space set on primary cell or the linked search space set on sSCell based on one of the following. If the sSCell active BWP is a BWP with a first search space set that is linked to a second search space set on the primary cell, UE can use the first search space set on sSCell for monitoring PDCCH candidates, and if the sSCell active BWP is switched to a BWP without any linked search space set with the primary cell (e.g. sSCell cannot schedule Pcell), UE can use the second search space set on primary cell for monitoring PDCCH candidates. When the UE is using the linked search space set on the sSCell, if the search space set on the sSCell is switched from the linked search space set to another search space set which is not linked to any search space set on the primary cell (e.g. in response to a search space group switching command via DCI format 2-0 or a search space switching command via DCI format 0-1 or DCI format 1-1 or some other DCI format), the UE can use the linked search space set on primary cell. When the UE is using the linked search space set on the sSCell, if the search space set on the sSCell is deactivated by a PDCCH DCI format or MAC CE, the UE can use the linked search space set on primary cell.

In additional or alternative embodiments, the UE may be configured with multiple SCells with sSCell like functionality. For such cases, a first search space set on primary cell can be linked with second search space set on SCell1, third search space set of SCell2 etc. The linking can be according to the approaches discussed for above options. Then, depending on whether the corresponding SCell is activated/deactivated or whether corresponding search space sets on those SCells are in use or not (e.g. according Options 2a,2b discussed above), the UE can monitor PDCCH candidates for DCI formats that schedule PDSCH/PUSCH on primary cell using either the first search space set or one or more of second, third etc. search space sets. Similarly, this can be extended by linking a first search space set on the primary cell with a search space set in SCell1, a second search space set on the primary cell with a search space set in SCell2 and switch the PDCCH monitoring accordingly.

In some examples, in current search space set configurations, when a UE-specific SS is configured, the UL and DL DCI formats for that search space have to be configured together. i.e., as part of SS configuration the IE dci-Formats can be formats0-1-And-1-1 or formats0-0-And-1-0. The consequence of this design is that, when the DCI sizes of UL and DL grants are different (this is usually the case with DCI format 0-1 and DCI format 1-1), the UE has to do two BDs for each PDCCH monitoring candidate, one corresponding to each DCI format.

In some embodiments, enhanced CCS frameworks have the flexibility for the sSCell to schedule any one of the below possibilities: sSCell used only for scheduling UL grants for primary cell (e.g. using DCI format 0-1 or 0-2); sSCell used for scheduling both UL grants and DL assignments for primary cell (e.g using DCI formats0-1-and-1-1 or 0-2-and- 1-2); or sSCell used only for scheduling only DL assignments for primary cell (e.g. using DCI format 1-1 or 1-2). Of the above, the first possibility is useful for cases where DSS carrier is used mainly for improving PUSCH coverage, and the sSCell is configured to move some PDCCH UL grant signaling overhead out of primary cell. To support the above possibilities without unnecessary increase of PDCCH BD overhead on sSCell, in some embodiments, configuring one of a) only DCI formats used for UL i.e., PUSCH scheduling b) only DCI formats used for DL i.e., PDSCH scheduling c) both DL and UL DCI formats can be supported as part of the search space set configuration of sSCell.

In some embodiments, the sSCell may be used to schedule UL grants and downlink assignments for the primary cell using non-fallback DCI formats only. The DCI format may contain a carrier indicator field. When UE is configured with an sSCell, one of the following options can be used for the CIF field. For the DCI formats on the sSCell that are used for scheduling PDSCH/PUSCH on primary cell, the CIF is included. The CIF field can be a fixed length (e.g. 3 bits) or its size can be RRC configured (e.g. 1,2,3 bits).

In some examples, for the DCI formats on the primary cell that are used for scheduling PDSCH/PUSCH on primary cell the CIF field is not included for any DCI format. In additional or alternative examples, for the DCI formats on the primary cell that are used for scheduling PDSCH/PUSCH on primary cell the field is included for some DCI formats (e.g. the DCI formats with same DCI format type as those used on sSCell for scheduling PDSCH/PUSCH on primary cell) and not included for other DCI formats. In some examples, for the DCI formats on the primary cell that are used for scheduling PDSCH/PUSCH on primary cell the CIF field is included in all non-fallback DCI formats (e.g. DCI format 0-1/1-1/0-2/1-2 but not included in fallback DCI format (e.g. DCI format 0-0/1-0).

In additional or alternative embodiments, the non-fallback DCI format used for scheduling primary cell may include a carrier indicator field on both the scheduling cells (primary cell, sSCell) of the primary cell.

In some embodiments, a UE configured with a primary cell and one or more secondary serving cells (SCells) in a cell group can perform operations. The operations can include receiving a first message and a second message as part of higher layer (e.g. RRC) configuration. The first message can be a cross-carrier scheduling configuration including at least one of: an indication that PDCCH DCI formats detected on a first SCell (special SCell or sSCell) of the one or more Scells can schedule PDSCH receptions or PUSCH transmissions on the primary cell; and a carrier indicator field value to be included in PDCCH DCI formats for scheduling PDSCH receptions or PUSCH transmissions on the primary cell. The second message can include at least a first search space set configuration with a first search space index. The operations can further include receiving a third message as part of higher layer (e.g. RRC) configuration for the primary cell. The third message can include at least a second search space set configuration with a second search space index, where the second search space set and the first search space set are linked, and the second search space set configuration includes a first number of PDCCH candidates. The operations can further include detecting a first PDCCH DCI format by monitoring a first set of PDCCH candidates on the sSCell and receiving a PDSCH on the primary cell that is scheduled by the detected first PDCCH DCI format, where the first set of PDCCH candidates determined based on the first number of PDCCH candidates included in the second search space set configuration and a first set of search space parameters included in the first search space set configuration. The first set of search space parameters can include one or more of a first CORESET (control Resource Set) index; a first periodicity, first offset and first duration for determining the slots corresponding to the search space; and a first indication of the DCI formats to be monitored. In some examples, a similar embodiment is possible for PUSCH transmission on the primary cell.

In additional or alternative embodiments, the second search space set configuration includes a second set of search space parameters including a second CORESET (control Resource Set) index, a second periodicity, second offset and second duration for determining the slots corresponding to the search space, and a second indication of the DCI formats to be monitored. The operations can further include detecting a second PDCCH DCI format by monitoring a second set of PDCCH candidates on the primary cell and receiving a PDSCH on the primary cell that is scheduled by the detected second PDCCH DCI format. The second set of PDCCH candidates can be determined based on the first number of PDCCH candidates and based on the second set of search space parameters included in the second search space set configuration.

In additional or alternative embodiments, the first set of PDCCH candidates can be monitored on the sSCell if the sSCell is activated, the second set of PDCCH candidates can be monitored on the primary cell if the sSCell is deactivated.

In additional or alternative embodiments, the operations can further include receiving a 'sSCell monitoring indication' (SMI) command. The first set of PDCCH candidates can be monitored on the sSCell if the SMI command indicates a first value and the second set of PDCCH candidates can be monitored on the primary cell if the SMI command indicates a second value In additional or alternative embodiments, the operations can further include monitoring the second set of PDCCH candidates on the primary cell for one or more of the following cases: the first search space set configuration is deactivated on the sSCell; or the active BWP of the sSCell is switched from a first BWP with the first search space set configuration to a second BWP without a search space set configuration linked to the second search space set configuration In additional or alternative embodiments, the first search space set and the second search space set are linked if the first search space index and second search space index are the same.

In additional or alternative embodiments, the first search space set and the second search space set are linked if the second search space set configuration includes an indication that the second search space set is linked to a search space with same search space index on the sSCell.

In additional or alternative embodiments, the first message is part of RRC configuration of primary cell and the second message is part of RRC configuration of sSCell.

In additional or alternative embodiments, the first and second messages are part of RRC configuration of the sSCell.

Figure 13:
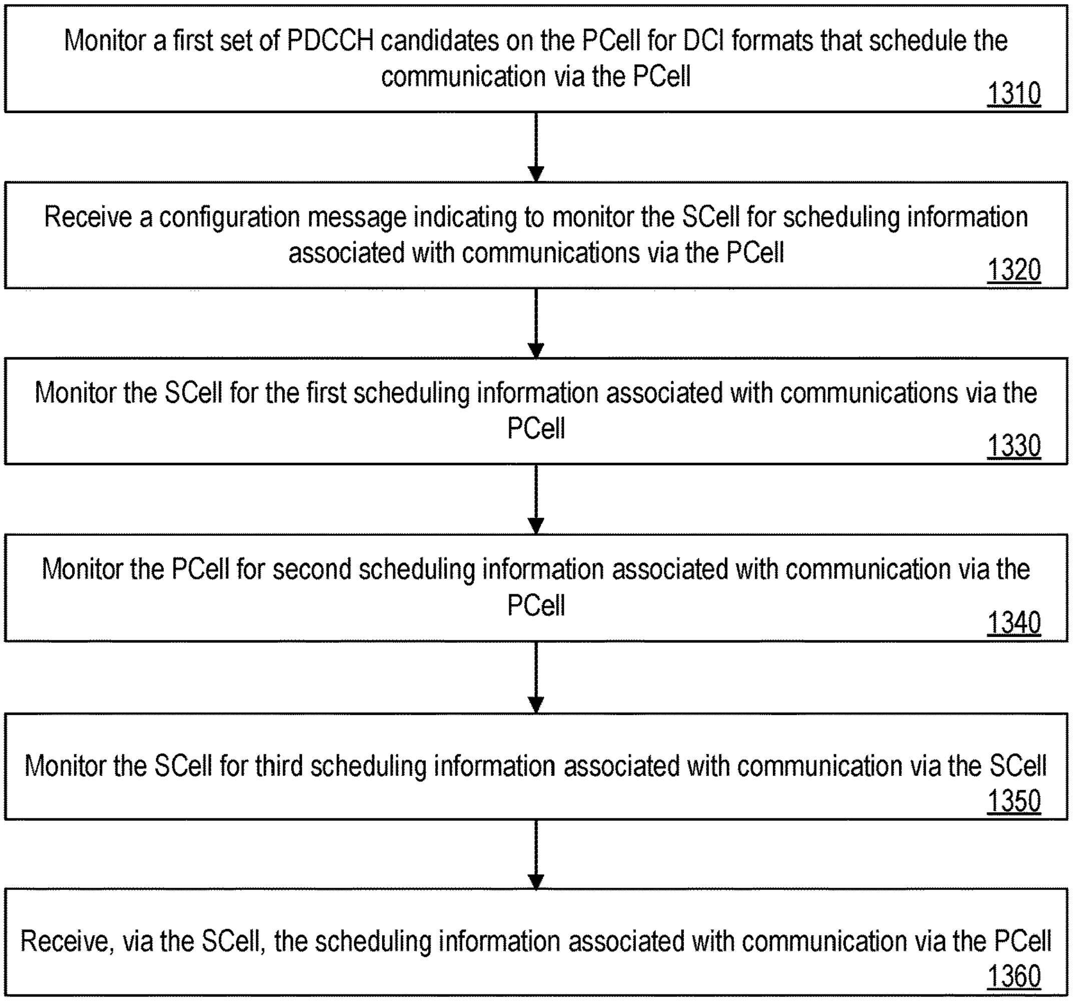
FIG. 13 is a flow chart illustrating examples of operations performed by a communication device in accordance with some embodiments.

Operations of a communication device will now be discussed with reference to the flow chart of FIG. 13 according to some embodiments of inventive concepts. FIG. 13 will be described below as being performed by network node 1000 (implemented using the structure of the block diagram of FIG. 10). For example, modules may be stored in memory 1005 of FIG. 10, and these modules may provide instructions so that when the instructions of a module are executed by respective processing circuitry 1003, processing circuitry

1003 performs respective operations of the flow chart. However, the operations in FIG. 13 may be performed by any suitable network node.

FIG. 13 illustrates an example of operations performed by a communication device for scheduling PCell communications via an SCell.

At block 1310, processing circuitry 1003 monitors a first set of PDCCH candidates on the PCell for DCI formats that schedule the communication via the PCell. At block 1320, processing circuitry 1003 receives, via transceiver 1001, a configuration message indicating to monitor the SCell for scheduling information associated with communications via the PCell. At block 1330, processing circuitry 1003 monitors the SCell for the first scheduling information associated with communications via the PCell. At block 1340, processing circuitry 1003 monitors the PCell for second scheduling information associated with communication via the PCell. At block 1350, processing circuitry 1003 monitors the SCell for third scheduling information associated with communication via the SCell. At block 1360, processing circuitry 1003 receives, via the SCell, the scheduling information associated with communication via the PCell.

Various operations of FIG. 13 may be optional with respect to some embodiments of communication devices and related methods. For example, regarding the method of Example Embodiment 1 below, for example, operations of blocks 1310, 1330, 1340, and 1350 of FIG. 13 may be optional.

Figure 14:
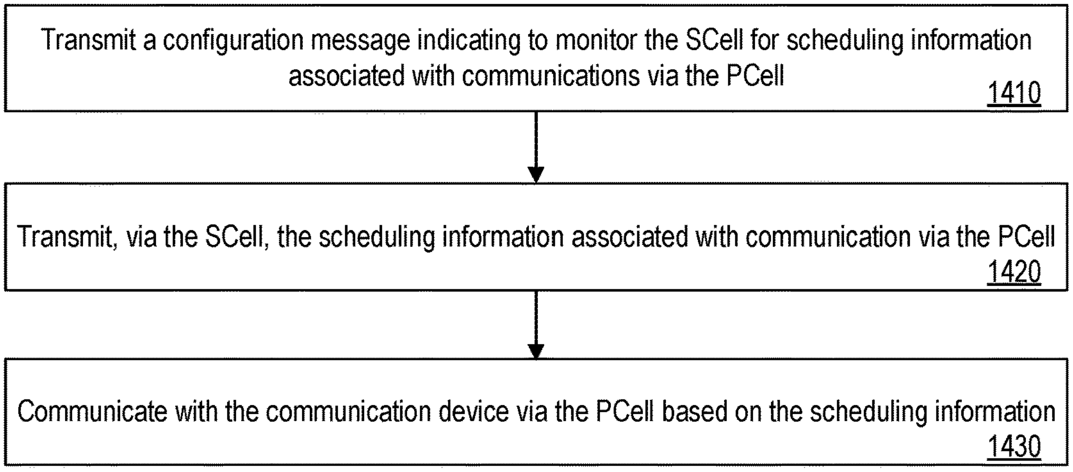
FIG. 14 is a flow chart illustrating examples of operations performed by a network node in accordance with some embodiments.

Operations of a network node will now be discussed with reference to the flow chart of FIG. 14 according to some embodiments of inventive concepts. FIG. 14 will be described below as being performed by network node 1100 (implemented using the structure of the block diagram of FIG. 11). For example, modules may be stored in memory 1105 of FIG. 11, and these modules may provide instructions so that when the instructions of a module are executed by respective processing circuitry 1103, processing circuitry 1103 performs respective operations of the flow chart. However, the operations in FIG. 14 may be performed by any suitable network node.

FIG. 14 illustrates an example of operations performed by a network node for scheduling PCell communications via an SCell. At block 1410, processing circuitry 1103 transmits, via transceiver 1101, a configuration message indicating to monitor the SCell for scheduling information associated with communications via the PCell. At block 1420, processing circuitry 1103 transmits, via transceiver 1101 and the SCell, the scheduling information associated with communication via the PCell. At block 1430, processing circuitry 1103 communicates, via transceiver 1101 and the PCell, with the communication device based on the scheduling information.

Various operations of FIG. 14 may be optional with respect to some embodiments of communication devices and related methods. For example, regarding the method of Example Embodiment 17 below, for example, operations of block 1430 of FIG. 14 may be optional.

Figure 15:
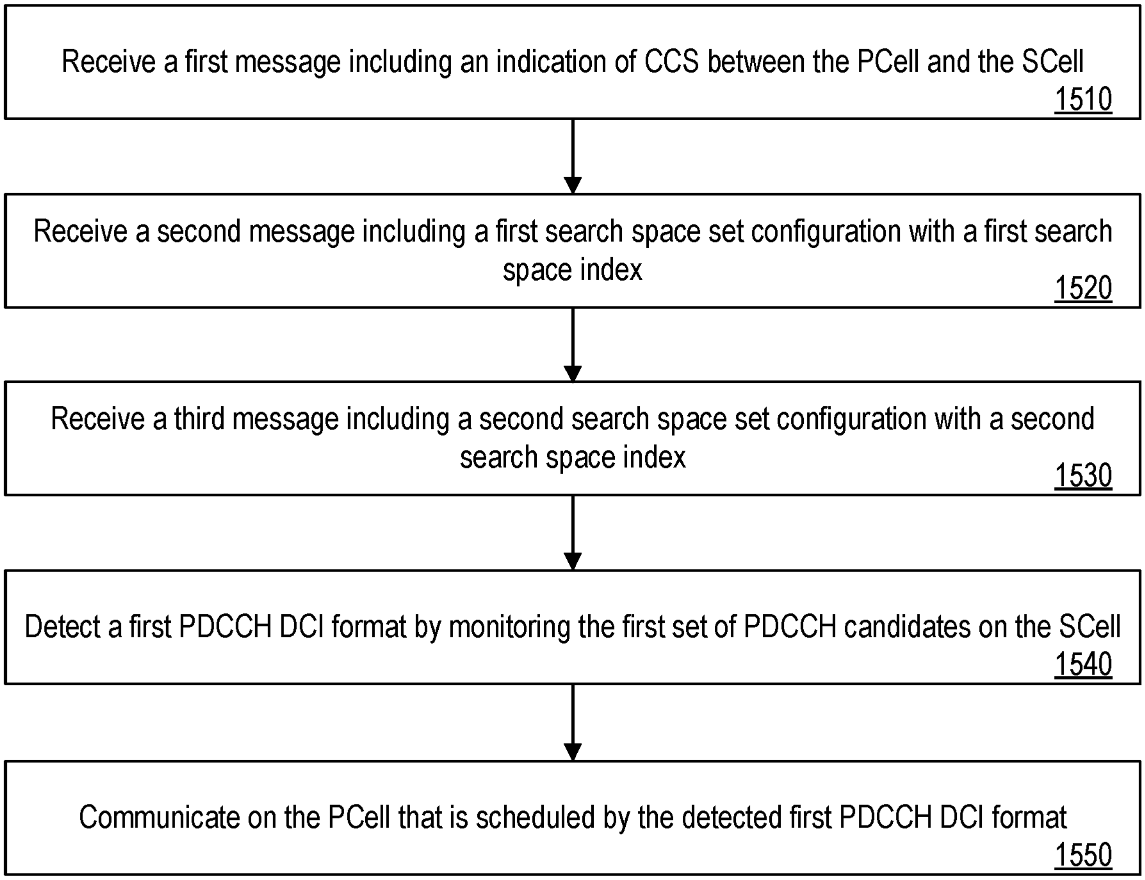
FIG. 15 is a flow chart illustrating examples of operations performed by a communication device in accordance with some embodiments.

Operations of a communication device will now be discussed with reference to the flow chart of FIG. 15 according to some embodiments of inventive concepts. FIG. 15 will be described below as being performed by network node 1000 (implemented using the structure of the block diagram of FIG. 10). For example, modules may be stored in memory 1005 of FIG. 10, and these modules may provide instructions so that when the instructions of a module are executed by respective processing circuitry 1003, processing circuitry 1003 performs respective operations of the flow chart. However, the operations in FIG. 15 may be performed by any suitable network node.

FIG. 15 illustrates an example of operations performed by a communication device for scheduling PCell communications via an SCell. At block 1510, processing circuitry 1003 receives, via transceiver 1101, a first message including an indication of CCS between the PCell and the SCell. At block 1520, processing circuitry 1003 receives, via transceiver 1101, a second message including a first search space set configuration with a first search space index. At block 1530, processing circuitry 1003 receives, via transceiver 1101, a third message including a second search space set configuration with a second search space index. At block 1540, processing circuitry 1003 detects a first PDCCH DCI format by monitoring the first set of PDCCH candidates on the SCell. At block 1550, processing circuitry 1003 communicates, via transceiver 1001, on the PCell that is scheduled by the detected first PDCCH DCI format.

Various operations of FIG. 15 may be optional with respect to some embodiments of communication devices and related methods.

Some further examples are included below.

Example 1. A method of operating a communication device operating in a communications network and configured to communicate with a network node operating in the communications network via a primary cell, PCell, and a secondary cell, SCell, the method comprising: receiving (1320) a configuration message from the network node indicating to monitor the SCell for scheduling information associated with communications via the PCell; and responsive to receiving the configuration message, receiving (1360), via the SCell, the scheduling information associated with communication via the PCell.

Example 2. The method of Example 1, further comprising: monitoring (1310), prior to receiving the configuration message, a first set of physical downlink control channel, PDCCH, candidates on the PCell for downlink control information, DCI, formats that schedule the communication via the PCell.

Example 3. The method of any of Examples 1-2, wherein the scheduling information is first scheduling information, the method further comprising: responsive to receiving the configuration message, monitoring (1330) the SCell for the first scheduling information associated with communication via the PCell; responsive to receiving the configuration message, monitoring (1340) the PCell for second scheduling information associated with communication via the PCell; and responsive to receiving the configuration message, monitoring (1350) the SCell for third scheduling information associated with communication via the SCell.

Example 4. The method of Example 3, wherein monitoring the SCell for the first scheduling information associated with communication via the PCell comprises monitoring a second set of physical downlink control channel, PDCCH, candidates that belong to a communication device-specific search space configured for the SCell, and wherein monitoring the PCell for the second scheduling information associated with communication via the PCell comprises monitoring a subset of the first set of PDCCH candidates that belong to a common search space configured for the PCell.

Example 5. The method of Example 3, wherein monitoring the SCell for the first scheduling information associated with communication via the PCell comprises monitoring a second set of physical downlink control channel, PDCCH, candidates that belong to a communication device-specific search space configured for the SCell, and wherein monitoring the PCell for the second scheduling information associated with communication via the PCell comprises monitoring a subset of the first set of PDCCH candidates that belong to a communication device-specific search space configured for the PCell.

Example 6. The method of any of Examples 3-5, wherein receiving the first scheduling information comprises responsive to monitoring the SCell for the first scheduling information, detecting a first information format in the SCell with cyclic redundancy check, CRC, scrambled by specific cell radio network temporary identifier, C-RNTI, scheduling a first communication with the network node via the primary cell; and responsive to receiving the scheduling information, performing the first communication with the network node via the PCell based on the scheduling information.

Example 7. The method of any of Examples 3-5, wherein receiving the first scheduling information comprises: responsive to monitoring the PCell for the second scheduling information, detecting a first information format in the PCell with cyclic redundancy check, CRC, scrambled by specific cell radio network temporary identifier, C-RNTI, scheduling a first communication with the network node in a first set of symbols of the primary cell; and responsive to monitoring the SCell for the first scheduling information, detecting a second information format in the SCell with cyclic redundancy check, CRC, scrambled by specific cell radio network temporary identifier, C-RNTI, scheduling a second communication with the network node in a second set of symbols of the primary cell.

Example 8. The method of Example 7, further comprising: responsive to the first set of symbols and the second set of symbols being separate in time, performing the first communication with the network node and the second communication with the network node.

Example 9. The method of Example 7, further comprising: responsive to the first set of symbols and the second set of symbols overlapping, performing the first communication with the network node; and responsive to the first set of symbols and the second set of symbols overlapping, discarding the first scheduling information.

Example 10. The method of any of Examples 3-5, wherein receiving the first scheduling information comprises: responsive to monitoring the PCell for the second scheduling information, detecting a first information format in the PCell with cyclic redundancy check, CRC, scrambled by specific cell radio network temporary identifier, C-RNTI, scheduling a first communication with the network node via the PCell, the first information format ending in a first symbol of the primary cell; and responsive to monitoring the SCell for the first scheduling information, detecting a second information format in the SCell with cyclic redundancy check, CRC, scrambled by specific cell radio network temporary identifier, C-RNTI, scheduling a second communication with the network node via the PCell, the second information format ending in a second symbol of the SCell, the end of the first symbol being earlier than the end of the second symbol.

Example 11. The method of Example 10, further comprising: responsive to the second communication starting after the end of the first communication, performing the first communication with the network node and the second communication with the network node.

Example 12. The method of Example 10, further comprising: responsive to the second communication starting before the end of the first communication, performing the first communication with the network node; and responsive to the second communication starting before the end of the first communication, discarding the first scheduling information.

Example 13. The method of any of Examples 1-12, wherein the configuration message is a radio resource control, RRC, message, wherein receiving the scheduling information comprises receiving a downlink control information, DCI, format via a set of physical downlink control channel, PDCCH, candidates on the SCell.

Example 14. The method of any of Examples 1-13, wherein the scheduling information comprises scheduling for physical downlink shared channel, PDSCH, receptions on the PCell.

Example 15. The method of any of Examples 1-13, wherein the scheduling information comprises scheduling for physical uplink shared channel, PUSCH, transmissions on the PCell.

Example 16. The method of any of Examples 1-15, wherein the scheduling information comprises scheduling for sounding reference signal, SRS, transmissions on the PCell.

Example 17. The method of any of Examples 1-16, wherein the PCell and the SCell are both part of either a master cell group, MCG, or a secondary cell group, SCG.

Example 18. A method of operating a network node operating in a communications network and configured to communicate with a communication device operating in the communications network via a primary cell, PCell, and a secondary cell, SCell, the method comprising transmitting (1410) a configuration message from the network node indicating to monitor the SCell for scheduling information associated with communications via the PCell; and responsive to transmitting the configuration message, transmitting (1420), via the SCell, the scheduling information associated with communication via the PCell.

Example 19. The method of Example 18, wherein the scheduling information is first scheduling information, and wherein the configuration message further indicates that the communication device: monitor the SCell for the first scheduling information associated with communication via the PCell;

- monitor the PCell for second scheduling information associated with communication via the PCell; and monitor the SCell for third scheduling information associated with communication via the SCell.

Example 20. The method of Example 19, wherein indicating that that the communication device monitor the SCell for the first scheduling information associated with communication via the PCell comprises indicating that the communication device monitor a second set of physical downlink control channel, PDCCH, candidates that belong to a communication device-specific search space configured for the SCell, and wherein indicating that that the communication device monitor the PCell for the second scheduling information associated with communication via the PCell comprises indicating that that the communication device monitor a subset of the first set of PDCCH candidates that belong to a common search space configured for the PCell.

Example 21. The method of Example 19, wherein indicating that that the communication device monitor the SCell for the first scheduling information associated with communication via the PCell comprises indicating that that the communication device monitor a second set of physical downlink control channel, PDCCH, candidates that belong to a communication device-specific search space configured for the SCell, and wherein indicating that that the communication device monitor the PCell for the second scheduling information associated with communication via the PCell comprises indicating that that the communication device monitor a subset of the first set of PDCCH candidates that belong to a communication device-specific search space configured for the PCell.

Example 22. The method of any of Examples 18-21, further comprising: responsive to transmitting (1430) the scheduling information, communicating with the network node via the PCell based on the scheduling information.

Example 23. The method of any of Examples 18-21, further comprising: transmitting a first information format in the PCell with cyclic redundancy check, CRC, scrambled by specific cell radio network temporary identifier, C-RNTI, scheduling a first communication with the communication device in a first set of symbols of the primary cell, wherein transmitting the scheduling information comprises transmitting a second information format in the SCell with cyclic redundancy check, CRC, scrambled by specific cell radio network temporary identifier, C-RNTI, scheduling a second communication with the communication device in a second set of symbols of the primary cell.

Example 24. The method of any of Examples 18-23, wherein receiving the first scheduling information comprises: responsive to monitoring the PCell for the second scheduling information, detecting a first information format in the PCell with cyclic redundancy check, CRC, scrambled by specific cell radio network temporary identifier, C-RNTI, scheduling a first communication with the network node via the PCell, the first information format ending in a first symbol of the primary cell; and responsive to monitoring the SCell for the first scheduling information, detecting a second information format in the SCell with cyclic redundancy check, CRC, scrambled by specific cell radio network temporary identifier, C-RNTI, scheduling a second communication with the network node via the PCell, the second information format ending in a second symbol of the SCell, the end of the first symbol being earlier than the end of the second symbol.

Example 25. The method of any of Examples 18-24, wherein the configuration message is a radio resource control, RRC, message, wherein transmitting the scheduling information comprises transmitting a downlink control information, DCI, format via a set of physical downlink control channel, PDCCH, candidates on the SCell.

Example 26. The method of any of Examples 18-25, wherein the scheduling information comprises scheduling for physical downlink shared channel, PDSCH, transmissions on the PCell.

Example 27. The method of any of Examples 18-25, wherein the scheduling information comprises scheduling for physical uplink shared channel, PUSCH, receptions on the PCell.

Example 28. The method of any of Examples 18-27, wherein the scheduling information comprises scheduling for sounding reference signal, SRS, transmissions on the PCell.

Example 29. The method of any of Examples 18-28, wherein the PCell and the SCell are both part of either a master cell group, MCG, or a secondary cell group, SCG.

Example 30. A method of operating a communication device operating in a communications network and configured to communicate with a network node operating in the communications network via a primary cell, PCell, and a secondary cell, SCell, the method comprising: receiving (1510) a first message from the network node, the first message including an indication of cross-carrier scheduling between the PCell and the SCell; receiving (1520) a second message from the network node, the second message including a first search space set configuration with a first search space index; receiving (1530) a third message from the network node, the third message including a second search space set configuration with a second search space index, the second search space set being linked to the first search space set and the second search space set configuration including a first number of physical downlink control channel, PDCCH, candidates; detecting (1540) a first PDCCH downlink control information, DCI, format by monitoring the first set of PDCCH candidates on the SCell; and communicating (1550) on the PCell that is scheduled by the detected first PDCCH DCI format.

Example 31. The method of Example 30, wherein the first message further includes an indication that PDCCH DCI formats detected on the SCell schedule PDSCH receptions or physical uplink shared channel, PUSCH, transmissions on the PCell.

Example 32. The method of Example 30, wherein the first message further includes a carrier indicator field value to be included in PDCCH DCI formats for scheduling PDSCH receptions or physical uplink shared channel, PUSCH, transmissions on the PCell.

Example 33. The method of any of Examples 30-32, wherein communicating on the PCell comprises receiving physical downlink shared channel, PDSCH, on the PCell.

Example 34. The method of any of Examples 30-32, wherein communicating on the PCell comprises transmitting physical uplink shared channel, PUSCH, on the PCell.

Example 35. The method of any of Examples 30-32, wherein communicating on the PCell comprises transmitting sounding reference signal, SRS, on the PCell.

Example 36. The method of any of Examples 30-35, wherein the first set of PDCCH candidates is determined based on the first number of PDCCH candidates included in the second search space set configuration.

Example 37. The method of any of Examples 30-35, wherein the first set of PDCCH candidates is determined based on the first set of search space parameters included in the first search space set configuration.

Example 38. The method of Example 37, wherein the first set of search space parameters include one or more of: a first control resource set index; a first periodicity, first offset, and first duration for determining the slots corresponding to the search space; and a first indication of the DCI formats to be monitored.

Example 39. The method of any of Examples 30-35, wherein the second search space set configuration includes a second set of search space parameters at least one of: a second control resource set index; a second periodicity, second offset, and second duration for determining the slots corresponding to the search space; and a second indication of the DCI formats to be monitored, the method further comprising: detecting a second PDCCH DCI format by monitoring the second set of PDCCH candidates on the PCell; and receiving a PDSCH on the primary cell that is scheduled by the detected second PDCCH DCI format, wherein the second set of PDCCH candidates is determined based on the first number of PDCCH candidates and based on the second set of search space parameters included in the second search space set configuration.

Example 40. The method of Example 39, further comprising: responsive to the SCell being active, monitoring the first set of PDCCH candidates on the SCell; and responsive to the SCell being inactive, monitoring the second set of PDCCH candidates on the PCell.

Example 41. The method of any of Examples 39-40, further comprising: receiving a SCell monitoring indication, SMI, command; and determining to monitor the first set of PDCCH candidates on the SCell or the second set of PDCCH candidates on the PCell based on the SMI command.

Example 42. The method of any of Examples 39-41, further comprising: monitoring the second set of PDCCH candidates on the PCell in response to at least one of the following: the first search space set configuration is deactivated on the SCell; and the active bandwidth part, BWP, of the SCell is switched from a first BWP with the first search space set configuration to a second BWP without a search space set configuration linked to the second search space set configuration.

Example 43. The method of any of Examples 30-42, wherein the first search space set and the second search space set are linked if the first search space index and second search space index are the same.

Example 44. The method of any of Examples 30-43, wherein the first message is part of radio resource control, RRC, configuration of the PCell, and wherein the second message is part of a RRC configuration of the SCell.

Example 45. The method of any of Examples 30-43, wherein the first message and the second message are part of radio resource control, RRC, configuration of the SCell.

Example 46. A communication device (1000) operating in a communications network and configured to communicate with a network node operating in the communications network via a primary cell, PCell, and a secondary cell, SCell, the communication device comprising: processing circuitry (1003); and memory (1005) coupled to the processing circuitry and having instructions stored therein that are executable by the processing circuitry to cause the communication device to perform operations, the operations comprising: receiving (1320) a configuration message from the network node indicating to monitor the SCell for scheduling information associated with communications via the PCell; and responsive to receiving the configuration message, receiving (1360), via the SCell, the scheduling information associated with communication via the PCell.

Example 47. The communication device of Example 46, operations further comprising: monitoring (1310), prior to receiving the configuration message, a first set of physical downlink control channel, PDCCH, candidates on the PCell for downlink control information, DCI, formats that schedule the communication via the PCell.

Example 48. The communication device of any of Examples 46-47, wherein the scheduling information is first scheduling information, the operations further comprising: responsive to receiving the configuration message, monitoring (1330) the SCell for the first scheduling information associated with communication via the PCell; responsive to receiving the configuration message, monitoring (1340) the PCell for second scheduling information associated with communication via the PCell; and responsive to receiving the configuration message, monitoring (1350) the SCell for third scheduling information associated with communication via the SCell.

Example 49. The communication device of Example 48, wherein monitoring the SCell for the first scheduling information associated with communication via the PCell comprises monitoring a second set of physical downlink control channel, PDCCH, candidates that belong to a communication device-specific search space configured for the SCell, and wherein monitoring the PCell for the second scheduling information associated with communication via the PCell comprises monitoring a subset of the first set of PDCCH candidates that belong to a common search space configured for the PCell.

Example 50. The communication device of Example 48, wherein monitoring the SCell for the first scheduling information associated with communication via the PCell comprises monitoring a second set of physical downlink control channel, PDCCH, candidates that belong to a communication device-specific search space configured for the SCell, and wherein monitoring the PCell for the second scheduling information associated with communication via the PCell comprises monitoring a subset of the first set of PDCCH candidates that belong to a communication device-specific search space configured for the PCell.

Example 51. The communication device of any of Examples 48-50, wherein receiving the first scheduling information comprises responsive to monitoring the SCell for the first scheduling information, detecting a first information format in the SCell with cyclic redundancy check, CRC, scrambled by specific cell radio network temporary identifier, C-RNTI, scheduling a first communication with the network node via the primary cell; and responsive to receiving the scheduling information, performing the first communication with the network node via the PCell based on the scheduling information.

Example 52. The communication device of any of Examples 48-50, wherein receiving the first scheduling information comprises: responsive to monitoring the PCell for the second scheduling information, detecting a first information format in the PCell with cyclic redundancy check, CRC, scrambled by specific cell radio network temporary identifier, C-RNTI, scheduling a first communication with the network node in a first set of symbols of the primary cell; and responsive to monitoring the SCell for the first scheduling information, detecting a second information format in the SCell with cyclic redundancy check, CRC, scrambled by specific cell radio network temporary identifier, C-RNTI, scheduling a second communication with the network node in a second set of symbols of the primary cell.

Example 53. The communication device of Example 52, the operations further comprising: responsive to the first set of symbols and the second set of symbols being separate in time, performing the first communication with the network node and the second communication with the network node.

Example 54. The communication device of Example 52, the operations further comprising: responsive to the first set of symbols and the second set of symbols overlapping, performing the first communication with the network node; and responsive to the first set of symbols and the second set of symbols overlapping, discarding the first scheduling information.

Example 55. The communication device of any of Examples 48-50, wherein receiving the first scheduling information comprises: responsive to monitoring the PCell for the second scheduling information, detecting a first information format in the PCell with cyclic redundancy check, CRC, scrambled by specific cell radio network temporary identifier, C-RNTI, scheduling a first communication with the network node via the PCell, the first information format ending in a first symbol of the primary cell; and responsive to monitoring the SCell for the first scheduling information, detecting a second information format in the SCell with cyclic redundancy check, CRC, scrambled by specific cell radio network temporary identifier, C-RNTI, scheduling a second communication with the network node via the PCell, the second information format ending in a second symbol of the SCell, the end of the first symbol being earlier than the end of the second symbol.

Example 56. The communication device of Example 55, the operations further comprising: responsive to the second communication starting after the end of the first communication, performing the first communication with the network node and the second communication with the network node.

Example 58. The communication device of Example 56, further comprising: responsive to the second communication starting before the end of the first communication, performing the first communication with the network node; and responsive to the second communication starting before the end of the first communication, discarding the first scheduling information.

Example 59. The communication device of any of Examples 46-58, wherein the configuration message is a radio resource control, RRC, message, wherein receiving the scheduling information comprises receiving a downlink control information, DCI, format via a set of physical downlink control channel, PDCCH, candidates on the SCell.

Example 60. The communication device of any of Examples 46-59, wherein the scheduling information comprises scheduling for physical downlink shared channel, PDSCH, receptions on the PCell.

Example 61. The communication device of any of Examples 46-59, wherein the scheduling information comprises scheduling for physical uplink shared channel, PUSCH, transmissions on the PCell.

Example 62. The communication device of any of Examples 46-61, wherein the scheduling information comprises scheduling for sounding reference signal, SRS, transmissions on the PCell.

Example 63. The communication device of any of Examples 46-62, wherein the PCell and the SCell are both part of either a master cell group, MCG, or a secondary cell group, SCG.

Example 64. A communication device (1000) operating in a communications network adapted to perform operations, the operations comprising: receiving (1320) a configuration message from the network node indicating to monitor the SCell for scheduling information associated with communications via the PCell; and responsive to receiving the configuration message, receiving (1360), via the SCell, the scheduling information associated with communication via the PCell.

Example 65. The communication device of Example 64 further adapted to perform any of the operations of Examples 2-17.

Example 66. A computer program comprising program code to be executed by processing circuitry (1003) of a communication device (1000) operating in a communications network, whereby execution of the program code causes the communication device to perform operations, the operations comprising: receiving (1320) a configuration message from the network node indicating to monitor the SCell for scheduling information associated with communications via the PCell; and responsive to receiving the configuration message, receiving (1360), via the SCell, the scheduling information associated with communication via the PCell.

Example 67. The computer program of Example 66, the operations further comprising any of the operations of Examples 2-17.

Example 68. A computer program product comprising a non-transitory storage medium including program code to be executed by processing circuitry (1003) of a communication device (1000) operating in a communications network, whereby execution of the program code causes the communication device to perform operations, the operations comprising: receiving (1320) a configuration message from the network node indicating to monitor the SCell for scheduling information associated with communications via the PCell; and responsive to receiving the configuration message, receiving (1360), via the SCell, the scheduling information associated with communication via the PCell.

Example 69. The computer program product of Example 68, the operations further comprising any of the operations of Examples 2-17.

Example 70. A network node (1100) operating in a communications network and configured to communicate with a communication device operating in the communications network via a primary cell, PCell, and a secondary cell, SCell, the network node comprising: processing circuitry (1103); and memory (1105) coupled to the processing circuitry and having instructions stored therein that are executable by the processing circuitry to cause the network node to perform operations, the operations comprising: transmitting (1410) a configuration message from the network node indicating to monitor the SCell for scheduling information associated with communications via the PCell; and responsive to transmitting the configuration message, transmitting (1420), via the SCell, the scheduling information associated with communication via the PCell.

Example 71. The network node of Example 70, wherein the scheduling information is first scheduling information, and wherein the configuration message further indicates that the communication device: monitor the SCell for the first scheduling information associated with communication via the PCell; monitor the PCell for second scheduling information associated with communication via the PCell; and monitor the SCell for third scheduling information associated with communication via the SCell.

Example 72. The network node of Example 71, wherein indicating that that the communication device monitor the SCell for the first scheduling information associated with communication via the PCell comprises indicating that the communication device monitor a second set of physical downlink control channel, PDCCH, candidates that belong to a communication device-specific search space configured for the SCell, and wherein indicating that that the communication device monitor the PCell for the second scheduling information associated with communication via the PCell comprises indicating that that the communication device monitor a subset of the first set of PDCCH candidates that belong to a common search space configured for the PCell.

Example 73. The network node of Example 71, wherein indicating that that the communication device monitor the SCell for the first scheduling information associated with communication via the PCell comprises indicating that that the communication device monitor a second set of physical downlink control channel, PDCCH, candidates that belong to a communication device-specific search space configured for the SCell, and wherein indicating that that the communication device monitor the PCell for the second scheduling information associated with communication via the PCell comprises indicating that that the communication device monitor a subset of the first set of PDCCH candidates that belong to a communication device-specific search space configured for the PCell.

Example 74. The network node of any of Examples 70-73, the operations further comprising: responsive to transmitting (1430) the scheduling information, communicating with the network node via the PCell based on the scheduling information.

Example 75. The network node of any of Examples 70-73, the operations further comprising: transmitting a first information format in the PCell with cyclic redundancy check, CRC, scrambled by specific cell radio network temporary identifier, C-RNTI, scheduling a first communication with the communication device in a first set of symbols of the primary cell, wherein transmitting the scheduling information comprises transmitting a second information format in the SCell with cyclic redundancy check, CRC, scrambled by specific cell radio network temporary identifier, C-RNTI, scheduling a second communication with the communication device in a second set of symbols of the primary cell.

Example 76. The network node of any of Examples 70-75, wherein receiving the first scheduling information comprises: responsive to monitoring the PCell for the second scheduling information, detecting a first information format in the PCell with cyclic redundancy check, CRC, scrambled by specific cell radio network temporary identifier, C-RNTI, scheduling a first communication with the network node via the PCell, the first information format ending in a first symbol of the primary cell; and responsive to monitoring the SCell for the first scheduling information, detecting a second information format in the SCell with cyclic redundancy check, CRC, scrambled by specific cell radio network temporary identifier, C-RNTI, scheduling a second communication with the network node via the PCell, the second information format ending in a second symbol of the SCell, the end of the first symbol being earlier than the end of the second symbol.

Example 77. The network node of any of Examples 70-76, wherein the configuration message is a radio resource control, RRC, message, wherein transmitting the scheduling information comprises transmitting a downlink control information, DCI, format via a set of physical downlink control channel, PDCCH, candidates on the SCell.

Example 78. The network node of any of Examples 70-77, wherein the scheduling information comprises scheduling for physical downlink shared channel, PDSCH, transmissions on the PCell.

Example 79. The network node of any of Examples 70-77, wherein the scheduling information comprises scheduling for physical uplink shared channel, PUSCH, receptions on the PCell.

Example 80. The network node of any of Examples 70-79, wherein the scheduling information comprises scheduling for sounding reference signal, SRS, transmissions on the PCell.

Example 81. The network node of any of Examples 70-79, wherein the PCell and the SCell are both part of either a master cell group, MCG, or a secondary cell group, SCG.

Example 82. A network node (1100) operating in a communications network adapted to perform operations, the operations comprising: transmitting (1410) a configuration message from the network node indicating to monitor the SCell for scheduling information associated with communications via the PCell; and responsive to transmitting the configuration message, transmitting (1420), via the SCell, the scheduling information associated with communication via the PCell.

Example 83. The network node of Example 82 further adapted to perform any of the operations of examples 19-29.

Example 84. A computer program comprising program code to be executed by processing circuitry (1103) of a network node (1100) operating in a communications network, whereby execution of the program code causes the network node to perform operations, the operations comprising: transmitting (1410) a configuration message from the network node indicating to monitor the SCell for scheduling information associated with communications via the PCell; and responsive to transmitting the configuration message, transmitting (1420), via the SCell, the scheduling information associated with communication via the PCell.

Example 85. The computer program of Example 84, the operations further comprising any of the operations of examples 19-29.

Example 86. A computer program product comprising a non-transitory storage medium including program code to be executed by processing circuitry (1103) of a network node (1100) operating in a communications network, whereby execution of the program code causes the network node to perform operations, the operations comprising: transmitting (1410) a configuration message from the network node indicating to monitor the SCell for scheduling information associated with communications via the PCell; and responsive to transmitting the configuration message, transmitting (1420), via the SCell, the scheduling information associated with communication via the PCell.

Example 87. The computer program product of Example 86, the operations further comprising any of the operations of Examples 19-29.

Example 88. A communication device (1000) operating in a communications network and configured to communicate with a network node operating in the communications network via a primary cell, PCell, and a secondary cell, SCell, the communication device comprising: processing circuitry (1003); and memory (1005) coupled to the processing circuitry and having instructions stored therein that are executable by the processing circuitry to cause the communication device to perform operations, the operations comprising: receiving (1510) a first message from the network node, the first message including an indication of cross-carrier scheduling between the PCell and the SCell; receiving (1520) a second message from the network node, the second message including a first search space set configuration with a first search space index; receiving (1530) a third message from the network node, the third message including a second search space set configuration with a second search space index, the second search space set being linked to the first search space set and the second search space set configuration including a first number of physical downlink control channel, PDCCH, candidates; detecting (1540) a first PDCCH downlink control information, DCI, format by monitoring the first set of PDCCH candidates on the SCell; and communicating (1550) on the PCell that is scheduled by the detected first PDCCH DCI format.

Example 89. The communication device of Example 88, wherein the first message further includes an indication that PDCCH DCI formats detected on the SCell schedule PDSCH receptions or physical uplink shared channel, PUSCH, transmissions on the PCell.

Example 90. The communication device of Example 88, wherein the first message further includes a carrier indicator field value to be included in PDCCH DCI formats for scheduling PDSCH receptions or physical uplink shared channel, PUSCH, transmissions on the PCell.

Example 91. The communication device of any of Examples 88-90, wherein communicating on the PCell comprises receiving physical downlink shared channel, PDSCH, on the PCell.

Example 92. The communication device of any of Examples 88-90, wherein communicating on the PCell comprises transmitting physical uplink shared channel, PUSCH, on the PCell.

Example 93. The communication device of any of Examples 88-90, wherein communicating on the PCell comprises transmitting sounding reference signal, SRS, on the PCell.

Example 94. The communication device of any of Examples 88-93, wherein the first set of PDCCH candidates is determined based on the first number of PDCCH candidates included in the second search space set configuration.

Example 95. The communication device of any of Examples 88-93, wherein the first set of PDCCH candidates is determined based on the first set of search space parameters included in the first search space set configuration.

Example 96. The communication device of Example 95, wherein the first set of search space parameters include one or more of: a first control resource set index; a first periodicity, first offset, and first duration for determining the slots corresponding to the search space; and a first indication of the DCI formats to be monitored.

Example 97. The communication device of any of Examples 88-93, wherein the second search space set configuration includes a second set of search space parameters at least one of: a second control resource set index; a second periodicity, second offset, and second duration for determining the slots corresponding to the search space; and a second indication of the DCI formats to be monitored, the operations further comprising: detecting a second PDCCH DCI format by monitoring the second set of PDCCH candidates on the PCell; and receiving a PDSCH on the primary cell that is scheduled by the detected second PDCCH DCI format, wherein the second set of PDCCH candidates is determined based on the first number of PDCCH candidates and based on the second set of search space parameters included in the second search space set configuration.

Example 98. The communication device of Example 97, further comprising: responsive to the SCell being active, monitoring the first set of PDCCH candidates on the SCell; and responsive to the SCell being inactive, monitoring the second set of PDCCH candidates on the PCell.

Example 99. The communication device of any of Examples 97-98, further comprising: receiving a SCell monitoring indication, SMI, command; and determining to monitor the first set of PDCCH candidates on the SCell or the second set of PDCCH candidates on the PCell based on the SMI command.

Example 100. The communication device of any of Examples 97-99, further comprising: monitoring the second set of PDCCH candidates on the PCell in response to at least one of the following: the first search space set configuration is deactivated on the SCell; and the active bandwidth part, BWP, of the SCell is switched from a first BWP with the first search space set configuration to a second BWP without a search space set configuration linked to the second search space set configuration.

Example 101. The communication device of any of Examples 88-100, wherein the first search space set and the second search space set are linked if the first search space index and second search space index are the same.

Example 102. The communication device of any of Examples 88-101, wherein the first message is part of radio resource control, RRC, configuration of the PCell, and wherein the second message is part of a RRC configuration of the SCell.

Example 103. The communication device of any of Examples 88-101, wherein the first message and the second message are part of radio resource control, RRC, configuration of the SCell.

Example 104. A communication device (1000) operating in a communications network adapted to perform operations, the operations comprising: receiving (1510) a first message from the network node, the first message including an indication of cross-carrier scheduling between the PCell and the SCell; receiving (1520) a second message from the network node, the second message including a first search space set configuration with a first search space index; receiving (1530) a third message from the network node, the third message including a second search space set configuration with a second search space index, the second search space set being linked to the first search space set and the second search space set configuration including a first number of physical downlink control channel, PDCCH, candidates; detecting (1540) a first PDCCH downlink control information, DCI, format by monitoring the first set of PDCCH candidates on the SCell; and communicating (1550) on the PCell that is scheduled by the detected first PDCCH DCI format.

Example 105. The communication device of Example 104 further adapted to perform any of the operations of examples 31-45.

Example 106. A computer program comprising program code to be executed by processing circuitry (1003) of a communication device (1000) operating in a communications network, whereby execution of the program code causes the communication device to perform operations, the operations comprising: receiving (1510) a first message from the network node, the first message including an indication of cross-carrier scheduling between the PCell and the SCell; receiving (1520) a second message from the network node, the second message including a first search space set configuration with a first search space index; receiving (1530) a third message from the network node, the third message including a second search space set configuration with a second search space index, the second search space set being linked to the first search space set and the second search space set configuration including a first number of physical downlink control channel, PDCCH, candidates; detecting (1540) a first PDCCH downlink control information, DCI, format by monitoring the first set of PDCCH candidates on the SCell; and communicating (1550) on the PCell that is scheduled by the detected first PDCCH DCI format.

Example 107. The computer program of Example 106, the operations further comprising any of the operations of examples 31-45.

Example 108. A computer program product comprising a non-transitory storage medium including program code to be executed by processing circuitry (1003) of a communication device (1000) operating in a communications network, whereby execution of the program code causes the communication device to perform operations, the operations comprising: receiving (1510) a first message from the network node, the first message including an indication of cross-carrier scheduling between the PCell and the SCell; receiving (1520) a second message from the network node, the second message including a first search space set configuration with a first search space index; receiving (1530) a third message from the network node, the third message including a second search space set configuration with a second search space index, the second search space set being linked to the first search space set and the second search space set configuration including a first number of physical downlink control channel, PDCCH, candidates; detecting (1540) a first PDCCH downlink control information, DCI, format by monitoring the first set of PDCCH candidates on the SCell; and communicating (1550) on the PCell that is scheduled by the detected first PDCCH DCI format.

Example 109. The computer program product of Example 68, the operations further comprising any of the operations of examples 31-45.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 16:
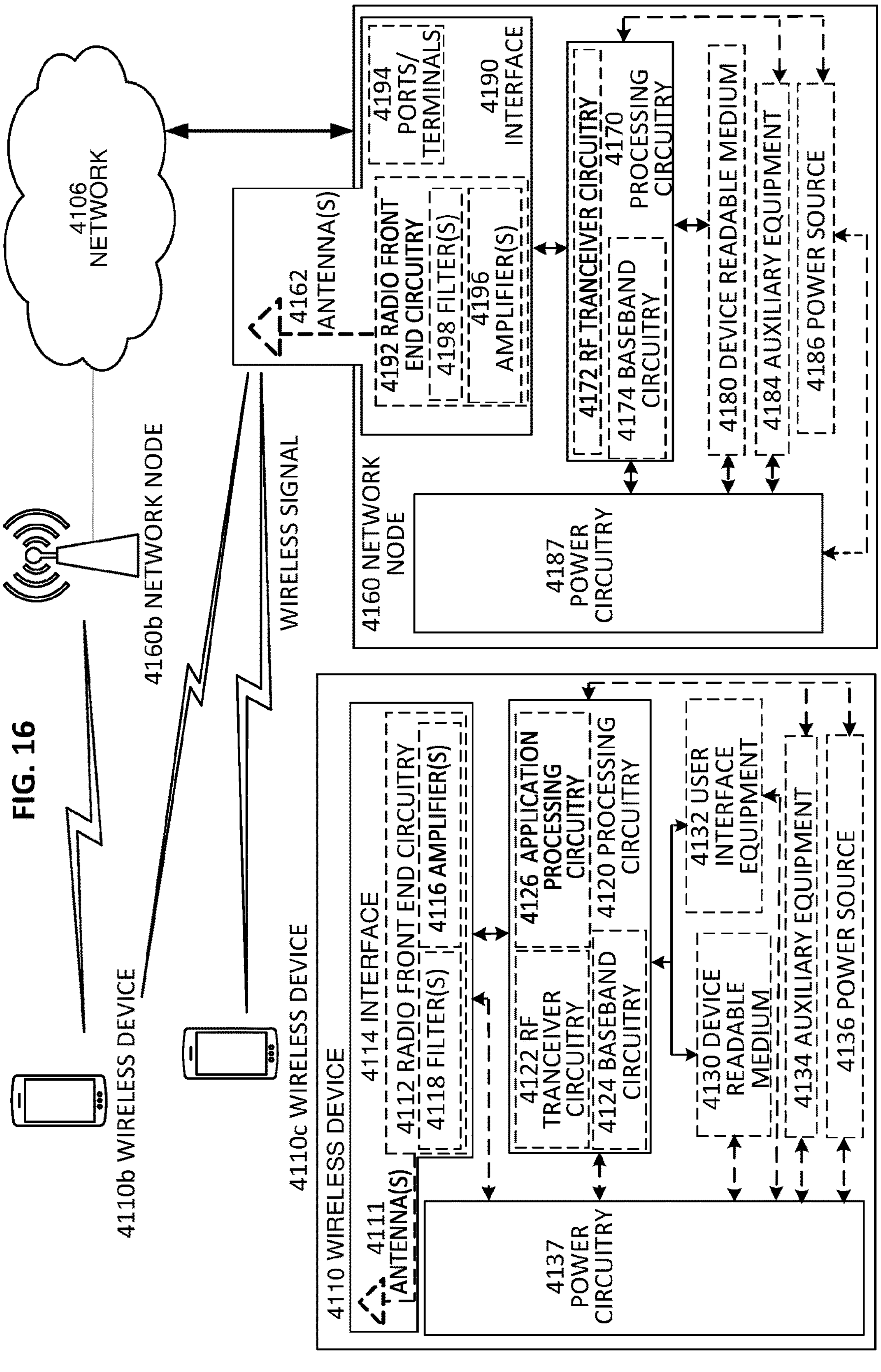
FIG. 16 is a block diagram of a wireless network in accordance with some embodiments.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 4106, network nodes 4160 and 4160*b*, and wireless devices 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and wireless device 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or wireless devices 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or wireless devices via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 16 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. wireless device 4110 may include multiple sets of one or more of the illustrated components for different wireless technologies supported by wireless device 4110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 4110.

Antenna 4111 may include one or more antennas or antenna arrays, configured to send and/or receive wireless signals, and is connected to interface 4114. In certain alternative embodiments, antenna 4111 may be separate from wireless device 4110 and be connectable to wireless device 4110 through an interface or port. Antenna 4111, interface 4114, and/or processing circuitry 4120 may be configured to perform any receiving or transmitting operations described herein as being performed by a wireless device. Any information, data and/or signals may be received from a network node and/or another wireless device. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, wireless device 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or wireless devices via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 4110 components, such as device readable medium 4130, wireless device 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of wireless device 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a wireless device may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of wireless device 4110, but are enjoyed by wireless device 4110 as a whole, and/or by end users and the wireless network generally.

Processing circuitry 4120 may be configured to perform any determining, calculating, or similar operations (e.g., certain obtaining operations) described herein as being performed by a wireless device. These operations, as performed by processing circuitry 4120, may include processing information obtained by processing circuitry 4120 by, for example, converting the obtained information into other information, comparing the obtained information or converted information to information stored by wireless device 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with wireless device 4110. Such interaction may be of many forms, such as visual, audial, tactile, etc. User interface equipment 4132 may be operable to produce output to the user and to allow the user to provide input to wireless device 4110. The type of interaction may vary depending on the type of user interface equipment 4132 installed in wireless device 4110. For example, if wireless device 4110 is a smart phone, the interaction may be via a touch screen; if wireless device 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into wireless device 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from wireless device 4110, and to allow processing circuitry 4120 to output information from wireless device 4110. User interface equipment 4132 may include, for example, a speaker, a display, vibrating circuitry, a USB port, a headphone interface, or other output circuitry. Using one or more input and output interfaces, devices, and circuits, of user interface equipment 4132, wireless device 4110 may communicate with end users and/or the wireless network, and allow them to benefit from the functionality described herein.

Auxiliary equipment 4134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 4134 may vary depending on the embodiment and/or scenario.

Figure 17:
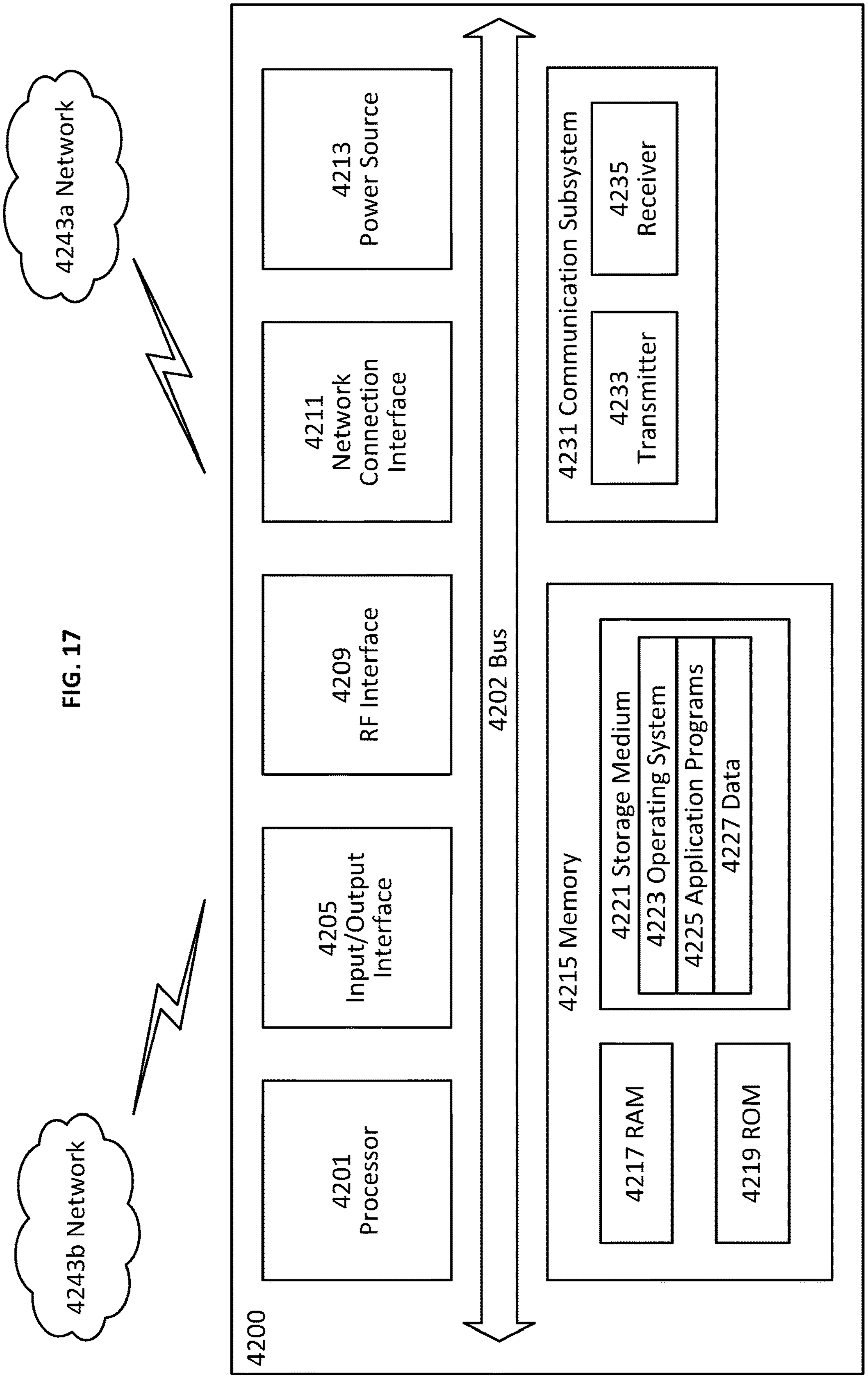
FIG. 17 is a block diagram of a user equipment in accordance with some embodiments.

Power source 4136 may, in some embodiments, be in the form of a battery or battery pack. Other types of power sources, such as an external power source (e.g., an electricity outlet), photovoltaic devices or power cells, may also be used. wireless device 4110 may further comprise power circuitry 4137 for delivering power from power source 4136 to the various parts of wireless device 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case wireless device 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 17, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 17 is a UE, the components discussed herein are equally applicable to a wireless device, and vice-versa.

In FIG. 17, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 17, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 18:
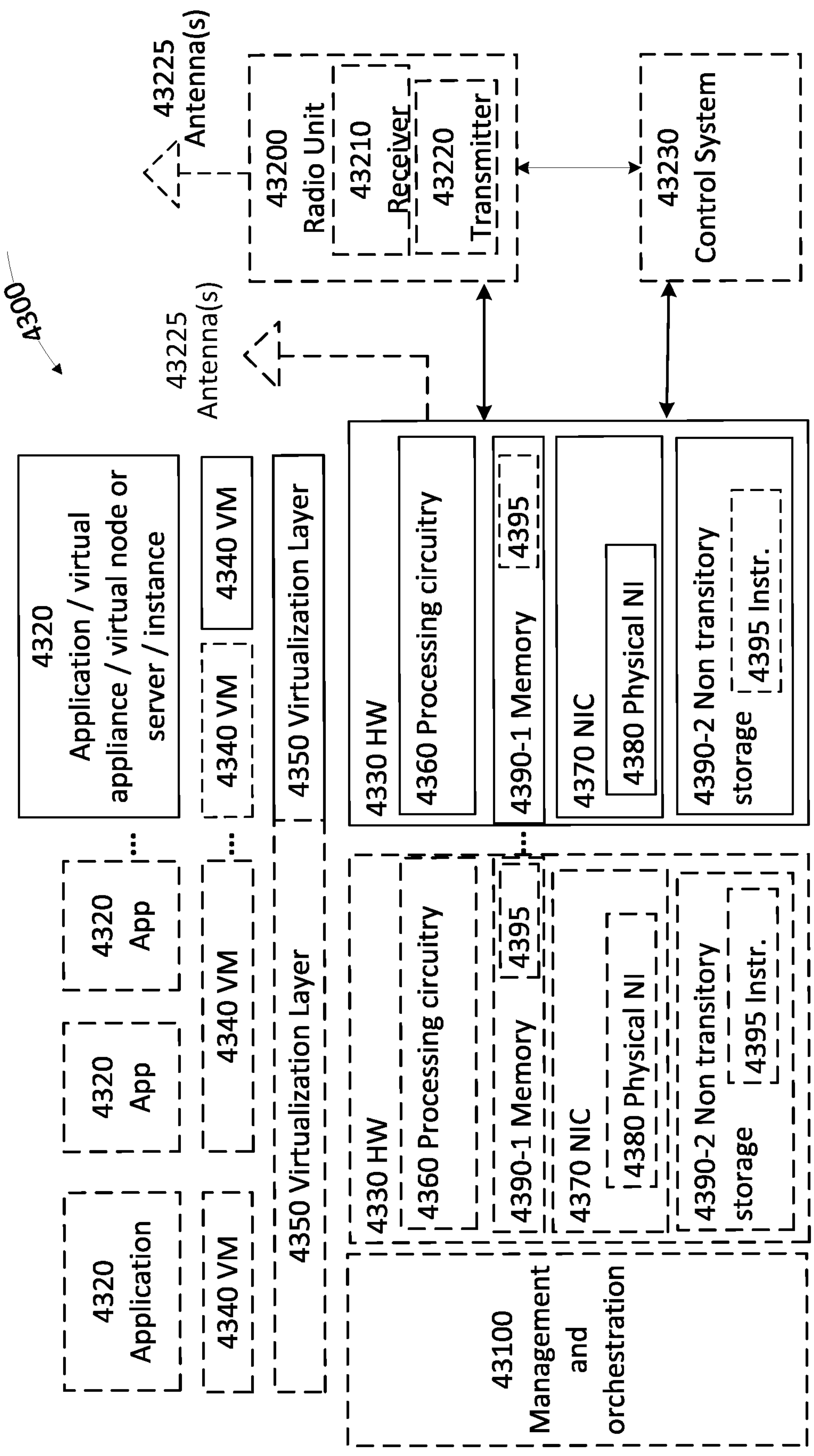
FIG. 18 is a block diagram of a virtualization environment in accordance with some embodiments.

FIG. 18 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 18, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 18.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 19:
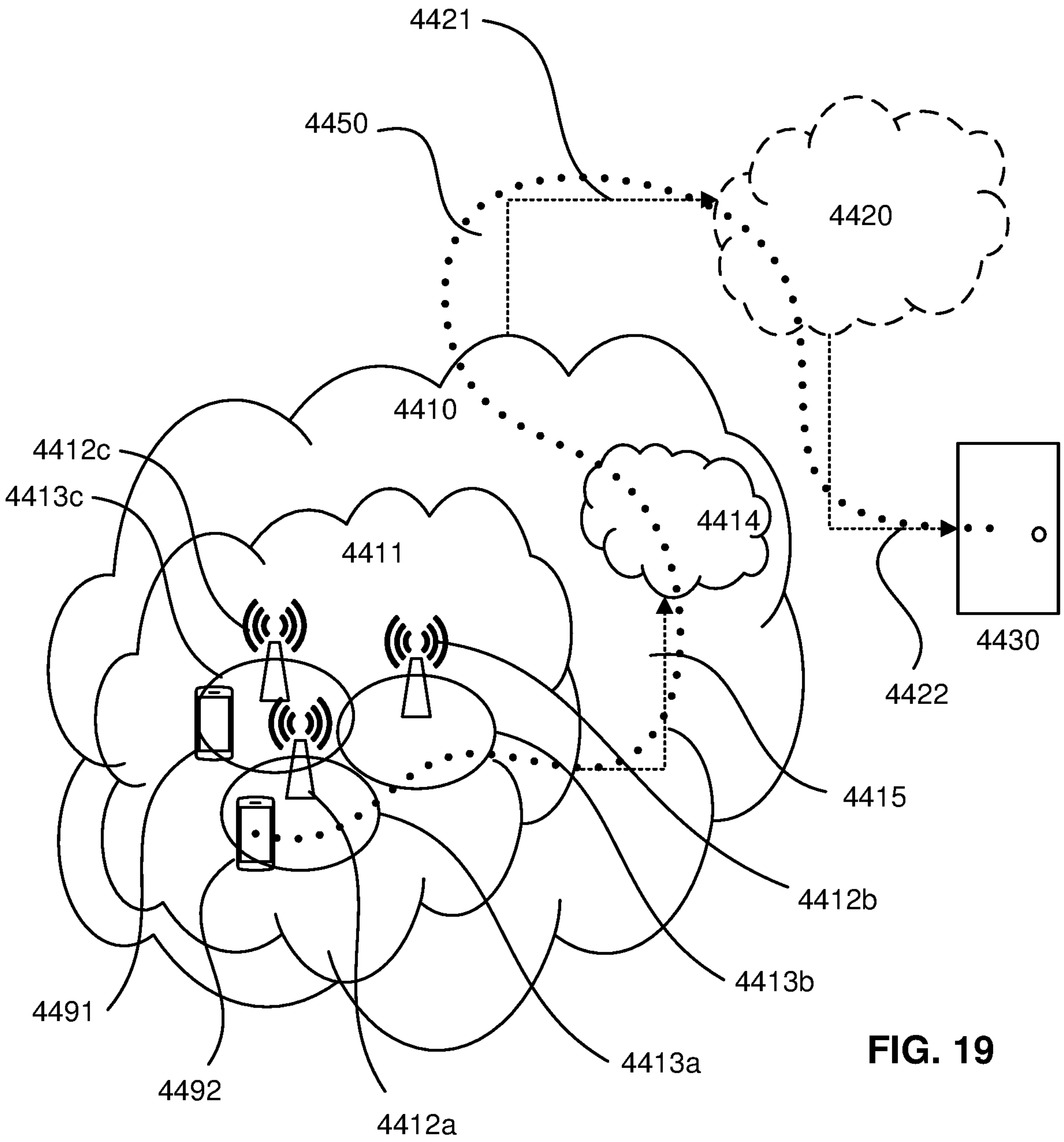
FIG. 19 is a block diagram of a telecommunication network connected via an intermediate network to a host computer in accordance with some embodiments.

FIG. 19 illustrates a telecommunication network connected via an intermediate network to a host computer in accordance with some embodiments.

With reference to FIG. 19, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 19 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 20:
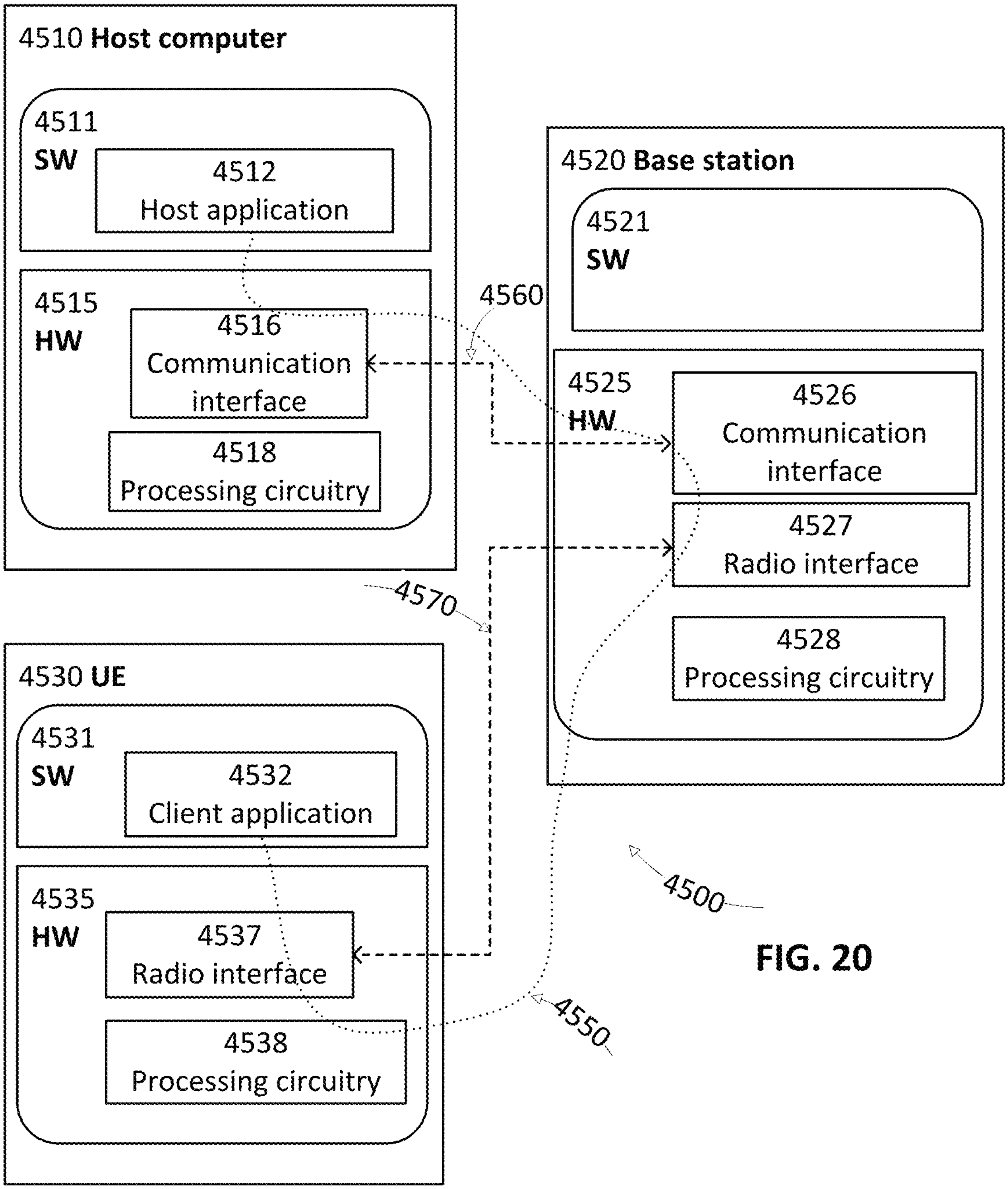
FIG. 20 is a block diagram of a host computer communicating via a base station with a user equipment over a partially wireless connection in accordance with some embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 20) served by base station 4520. Communication interface 4526 may be configured to facilitate connection 4560 to host computer 4510. Connection 4560 may be direct or it may pass through a core network (not shown in FIG. 20) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 20 may be similar or identical to host computer 4430, one of base stations 4412*a*, 4412*b*, 4412*c* and one of UEs 4491, 4492 of FIG. 19, respectively. This is to say, the inner workings of these entities may be as shown in FIG. 20 and independently, the surrounding network topology may be that of FIG. 19.

In FIG. 20, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 21:
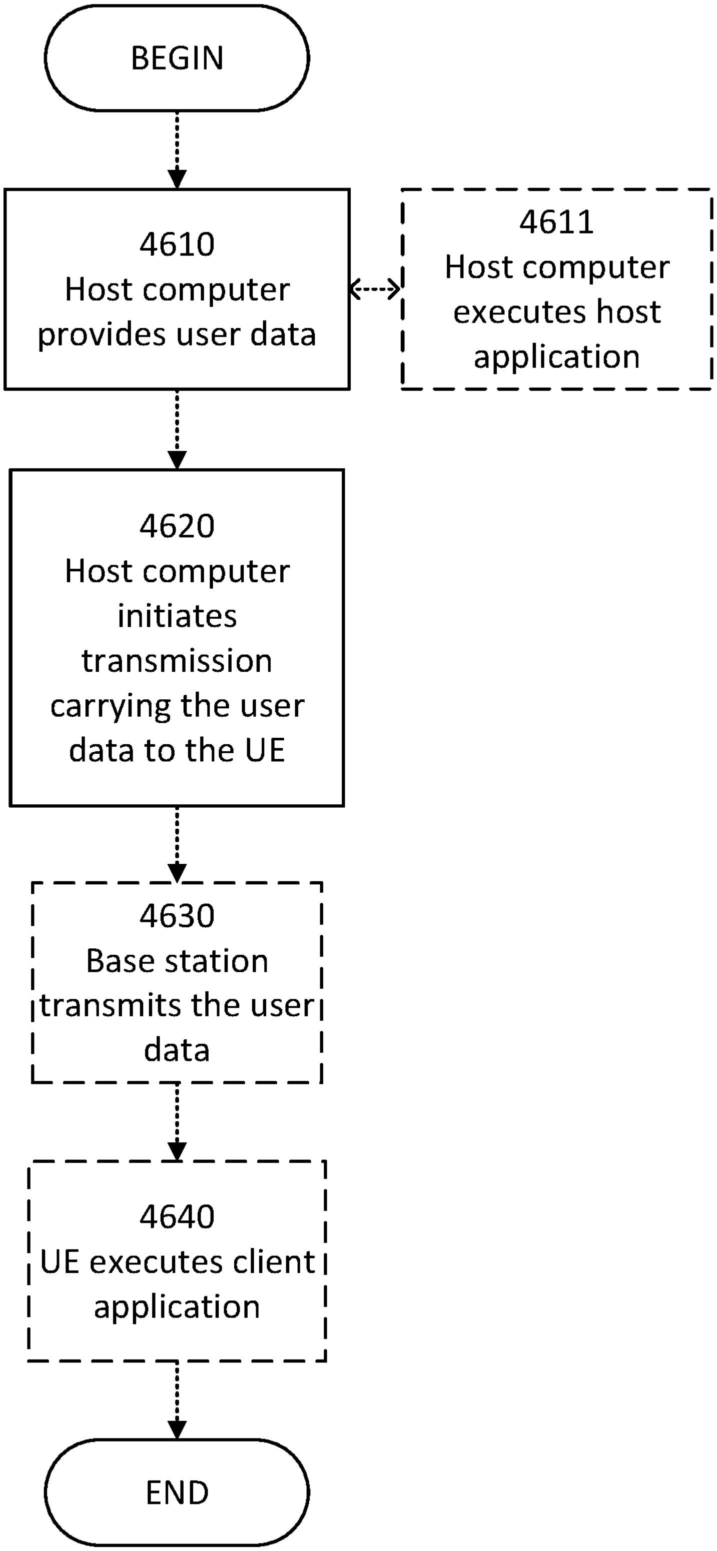
FIG. 21 is a block diagram of methods implemented in a communication system including a host computer, a base station, and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 21 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 22:
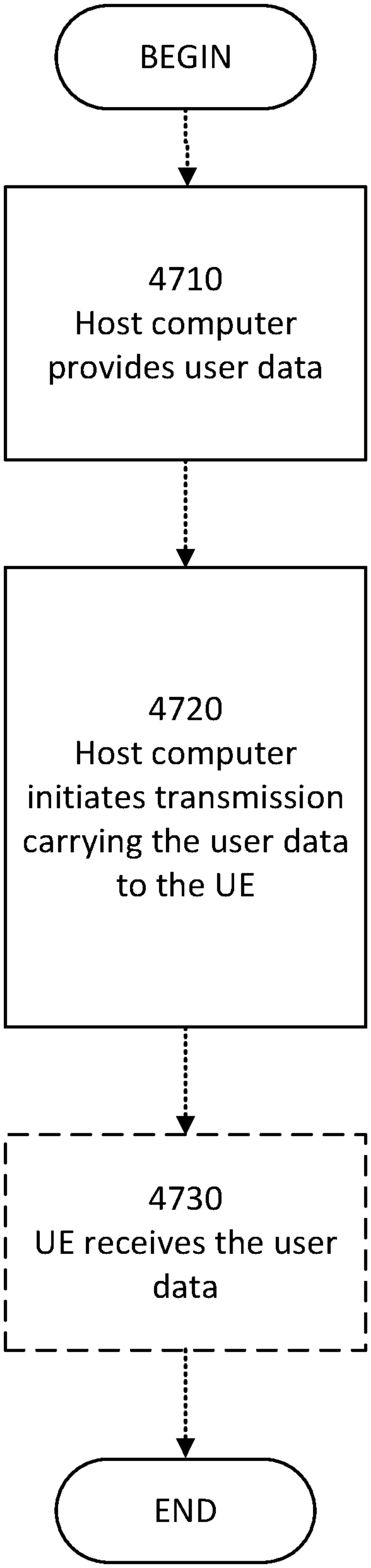
FIG. 22 is a block diagram of methods implemented in a communication system including a host computer, a base station, and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 22 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 23:
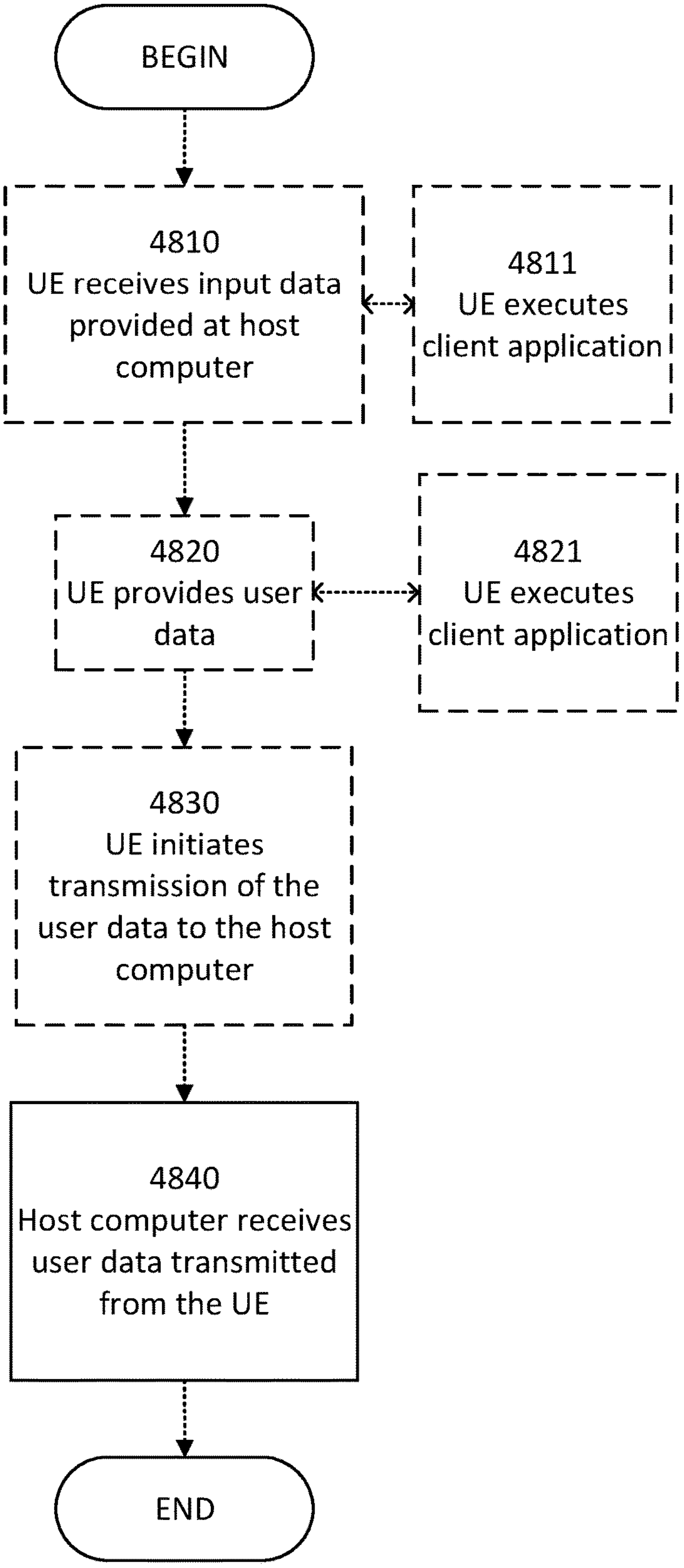
FIG. 23 is a block diagram of methods implemented in a communication system including a host computer, a base station, and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 23 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 24:
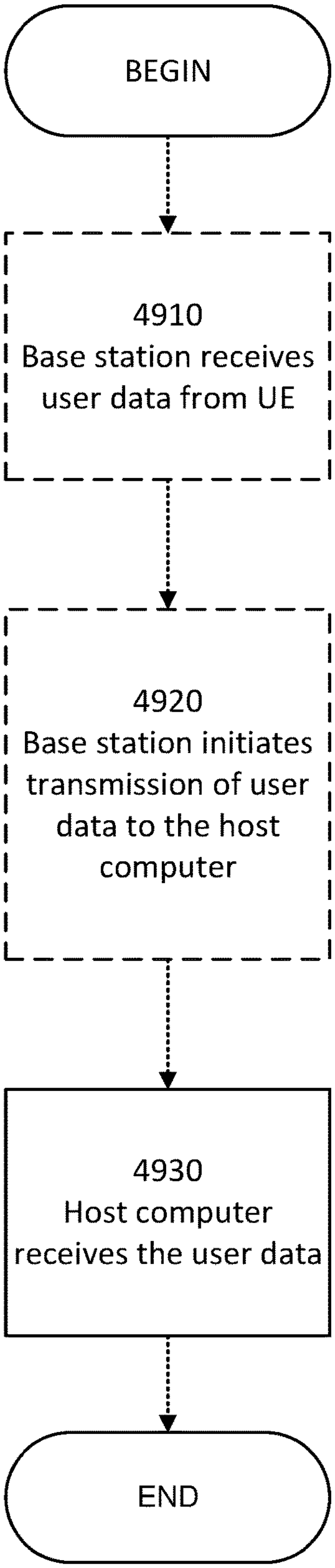
FIG. 24 is a block diagram of methods implemented in a communication system including a host computer, a base station, and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 24 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device operating in a communications network and configured to communicate with a network node operating in the communications network via a primary cell, PCell, and one or more secondary cells, SCells, the method comprising:

receiving a configuration message from the network node to configure an SCell of the one or more SCells as a scheduling cell for cross carrier scheduling wherein when the configuration message configures the SCell as the scheduling cell the communication device is configured to:

monitor the SCell for first scheduling information associated with communications via the PCell;

only monitor the PCell for second scheduling information associated with second communications for the PCell and not monitor the PCell for any scheduling information associated with communications for any SCells of the one or more SCells; and only monitor for scheduling related to communications for the SCell configured for scheduling on the SCell.

2. The method of claim 1, further comprising:

responsive to receiving the configuration message from the network node, monitoring the PCell only for scheduling information associated with communication via the PCell and monitor on the SCell for scheduling information for the PCell and scheduling information for at least one other SCell.

3. The method of claim 1, further comprising:

monitoring, when the SCell configured for scheduling is deactivated, physical downlink control channel, PDCCH, candidates on the PCell for PDCCH downlink control information, DCI, formats that schedule the communications on the PCell and/or on at least one other SCell and ceasing to monitor for PDCCH candidates on the SCell for communication on the PCell.

4. The method of claim 1, wherein monitoring the SCell for the first scheduling information associated with communication via the PCell comprises monitoring a second set of physical downlink control channel, PDCCH, candidates that belong to a communication device-specific search space configured for the SCell, and wherein monitoring the PCell for the second scheduling information associated with communication via the PCell comprises monitoring a subset of a set of PDCCH candidates that belong to a common search space or a device-specific search space configured for the PCell.

5. The method of claim 1, further comprising:

receiving, via the PCell, the second scheduling information associated with communication via the PCell, wherein receiving the first scheduling information and receiving the second scheduling information comprises:

responsive to monitoring the PCell for the second scheduling information, detecting a first PDCCH DCI format in the PCell with cyclic redundancy check, CRC, scrambled by specific cell radio network temporary identifier, C-RNTI, scheduling a first communication with the network node via the PCell, the first PDCCH DCI format ending in a first symbol of the PCell; and responsive to monitoring the SCell for the first scheduling information, detecting a second PDCCH DCI format in the SCell with cyclic redundancy check, CRC, scrambled by specific cell radio network temporary identifier, C-RNTI, scheduling a second communication with the network node via the PCell, the second PDCCH DCI format ending in a second symbol of the SCell, the end of the first symbol being earlier than the end of the second symbol.

6. The method of claim 5, wherein the second communication starts after the end of the first communication, the method further comprising:

performing the first communication with the network node and the second communication with the network node.

7. The method of claim 4, wherein receiving the configuration message comprises:

receiving a first search space set configuration with a first search space index; and receiving a second search space set configuration with a second search space index, the second search space set being linked to the first search space set and the second search space set configuration including a first number of physical downlink control channel, PDCCH, candidates, wherein monitoring the SCell comprises monitoring the second set of PDCCH candidates on the SCell, and wherein receiving the first scheduling information comprises detecting a first PDCCH downlink control information, DCI, format by monitoring the second set of PDCCH candidates on the SCell.

8. The method of claim 7, wherein the communication device is configured with a set of PDCCH candidates is determined based on at least one of:

the first number of PDCCH candidates included in the second search space set configuration; and the first set of search space parameters included in the first search space set configuration, wherein the first set of search space parameters include one or more of:

a first control resource set index;

a first periodicity, first offset, and first duration for determining slots corresponding to the search space; and a first indication of PDCCH DCI formats to be monitored.

9. The method of claim 1, wherein the communication device is configured with a set of search space parameters including at least one of: a second control resource set index; a second periodicity, second offset, and second duration for determining slots corresponding to the search space; and a second indication of PDCCH DCI formats to be monitored, the method further comprising:

detecting a second PDCCH DCI format by monitoring a third set of PDCCH candidates on the PCell; and communicating on the PCell that is scheduled by the detected second PDCCH DCI format.

10. The method of claim 7, further comprising:

monitoring a third set of PDCCH candidates on the PCell in response to at least one of the following: the first search space set configuration is deactivated on the SCell; and an active bandwidth part, BWP, of the SCell is switched from a first BWP with the first search space set configuration to a second BWP without a search space set configuration linked to the second search space set configuration.

11. A method of operating a network node operating in a communications network and configured to communicate with a communication device operating in the communications network via a primary cell, PCell, and one or more secondary cells, SCells, the method comprising transmitting a configuration message from the network node to configure an SCell of the one or more SCells as a scheduling cell for cross carrier scheduling wherein when the configuration message configures the SCell as the scheduling cell the communication device is configured to:

monitor the SCell for first scheduling information associated with communications via the PCell;

only monitor the PCell for second scheduling information associated with second communications with the PCell and not monitor the PCell for any scheduling information associated with communications for any SCells of the one of more SCells; and only monitor for scheduling related to communications for the SCell configured for scheduling on the SCell.

12. The method of claim 11, further comprising:

transmitting the first scheduling information on the scheduling SCell and transmitting the second scheduling information on the PCell based on communication with the network node via the PCell based on the configuration message.

13. A communication device operating in a communications network and configured to communicate with a network node operating in the communications network via a primary cell, PCell, and a secondary cell, SCell, the communication device comprising:

processing circuitry; and memory coupled to the processing circuitry and having instructions stored therein that are executable by the processing circuitry to cause the communication device to perform any of the operations of claim 1.

14. A network node operating in a communications network and configured to communicate with a communication device operating in the communications network via a primary cell, PCell, and a secondary cell, SCell, the network node comprising:

processing circuitry; and memory coupled to the processing circuitry and having instructions stored therein that are executable by the processing circuitry to cause the network node to perform any of the operations of claim 11.

15. A computer program comprising a non-transitory computer readable medium storing program code to be executed by processing circuitry whereby execution of the program code causes the processing circuitry to receive a configuration message from a network node to configure a secondary cell, SCell, of one or more SCells as a scheduling cell for cross carrier scheduling wherein when the configuration message configures the SCell as the scheduling cell a communication device is configured to:

monitor the SCell for first scheduling information associated with communications via a primary cell, PCell;

only monitor the PCell for second scheduling information associated with second communications for the PCell and not monitor the PCell for any scheduling information associated with communications for any SCells of the one or more SCells; and only monitor for scheduling related to communications for the SCell configured for scheduling on the SCell.

16. The method of claim 1, wherein monitoring the PCell for the second scheduling information associated with communication via the PCell comprises monitoring a subset of a set of PDCCH candidates that belong to a device-specific search space configured for the PCell.

17. The method of claim 1, further comprising:

responsive to monitoring the PCell for the second scheduling information, detecting a first PDCCH DCI format in the PCell, the first PDCCH DCI format ending in a first symbol of the PCell; and responsive to monitoring the SCell for the first scheduling information, detecting a second PDCCH DCI format in the SCell, the second PDCCH DCI format ending in a second symbol of the SCell, the end of the first symbol being earlier than the end of the second symbol.

* * * * *